US011960155B1

(12) United States Patent
Akselrod et al.

(10) Patent No.: US 11,960,155 B1
(45) Date of Patent: Apr. 16, 2024

(54) TWO-DIMENSIONAL METASURFACES WITH INTEGRATED CAPACITORS AND ACTIVE-MATRIX DRIVER ROUTING

(71) Applicant: Lumotive, Inc., Redmond, WA (US)

(72) Inventors: Gleb M. Akselrod, Kenmore, WA (US); Erik Edward Josberger, Renton, WA (US)

(73) Assignee: Lumotive, Inc., Redmond, WA (US)

( * ) Notice: Subject to any disclaimer, the term of this patent is extended or adjusted under 35 U.S.C. 154(b) by 0 days.

(21) Appl. No.: 18/481,936

(22) Filed: Oct. 5, 2023

(51) Int. Cl.
*G02F 1/015* (2006.01)
*G02F 1/01* (2006.01)
*G02F 1/03* (2006.01)
*G02F 1/035* (2006.01)

(52) U.S. Cl.
CPC .......... *G02F 1/0151* (2021.01); *G02F 1/0113* (2021.01); *G02F 1/0338* (2013.01); *G02F 1/035* (2013.01); *G02F 2203/15* (2013.01)

(58) Field of Classification Search
None
See application file for complete search history.

(56) References Cited

U.S. PATENT DOCUMENTS

| | | |
|---|---|---|
| 10,451,800 B2 | 10/2019 | Akselrod |
| 10,665,953 B1 | 5/2020 | Akselrod |
| 10,790,324 B2 | 9/2020 | Akselrod |
| 10,915,002 B2 | 2/2021 | Akselrod |
| 10,968,522 B2 | 4/2021 | Akselrod |
| 11,037,973 B2 | 6/2021 | Akselrod |
| 11,092,675 B2 | 8/2021 | Akselrod |
| 11,429,008 B1 | 8/2022 | Akselrod |
| 11,846,865 B1 | 12/2023 | Akselrod |
| 2012/0194399 A1 | 8/2012 | Bily |
| 2014/0266946 A1 | 9/2014 | Bily |
| 2015/0162658 A1 | 6/2015 | Bowers |
| 2015/0318618 A1 | 11/2015 | Chen |

(Continued)

FOREIGN PATENT DOCUMENTS

WO 2018156793 A1 8/2018

OTHER PUBLICATIONS

International Patent Application No. PCT/US2023/073445, International Search Report and Written Opinion mailed Nov. 17, 2023, 13 pp.

*Primary Examiner* — Christopher Stanford
*Assistant Examiner* — Journey F Sumlar
(74) *Attorney, Agent, or Firm* — PCFB, LLC; Justin K. Flanagan

(57) ABSTRACT

A metasurface may include a substrate layer and a two-dimensional array of metallic optical pillars arranged in rows and columns. A tunable dielectric material with a tunable refractive index is positioned between row-adjacent optical resonators. A two-dimensional active-matrix driver includes integrated driver routing layer(s), capacitor layer (s), and/or transistor layer(s). The driver routing layers enable row and column addressing of the two-dimensional array of metallic pillars via a row conductor for each row of metallic pillars and a column conductor for each column of metallic pillars. A transistor layer includes transistor devices connected to and configured to be selectively driven by the row and column conductors. The capacitor layer includes a plurality of storage capacitors. Each metallic pillar is connected in parallel to one of the storage capacitors in the capacitor layer and one of the transistor devices in the transistor layer.

35 Claims, 29 Drawing Sheets

(56) References Cited

U.S. PATENT DOCUMENTS

| | | |
|---|---|---|
| 2015/0318620 A1 | 11/2015 | Black |
| 2015/0372389 A1 | 12/2015 | Chen |
| 2015/0380828 A1 | 12/2015 | Black |
| 2017/0212285 A1 | 7/2017 | Arbabi |
| 2018/0196137 A1 | 7/2018 | Lee |
| 2018/0241131 A1 | 8/2018 | Akselrod |
| 2018/0248267 A1 | 8/2018 | Akselrod |
| 2019/0285798 A1 | 9/2019 | Akselrod |
| 2019/0301025 A1 | 10/2019 | Akselrod |
| 2020/0249396 A1 | 8/2020 | Akselrod |

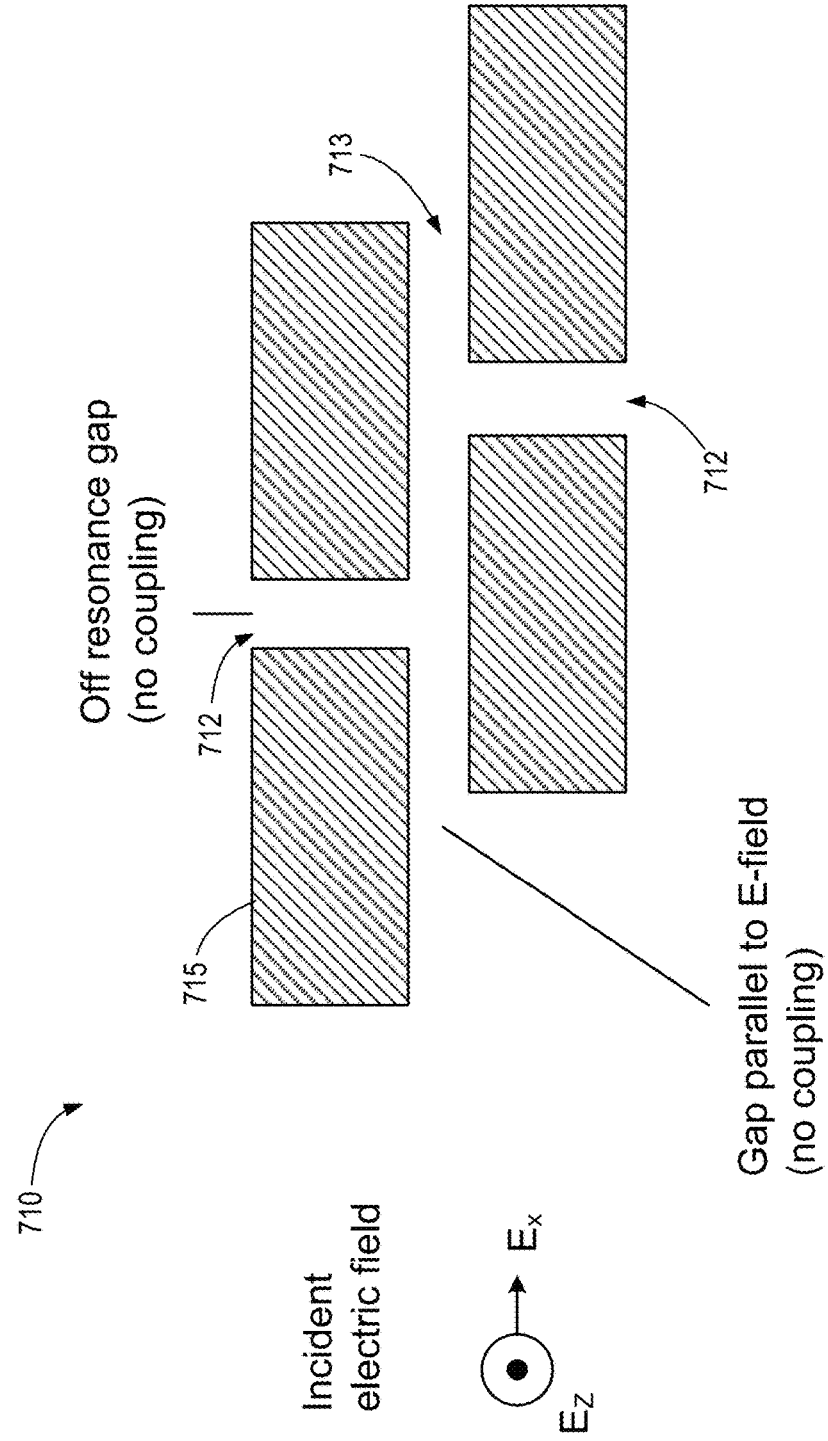

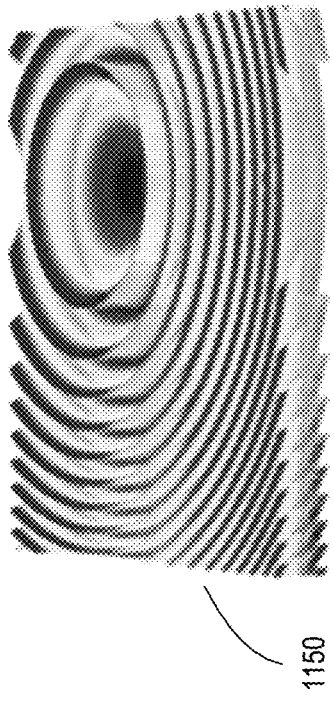
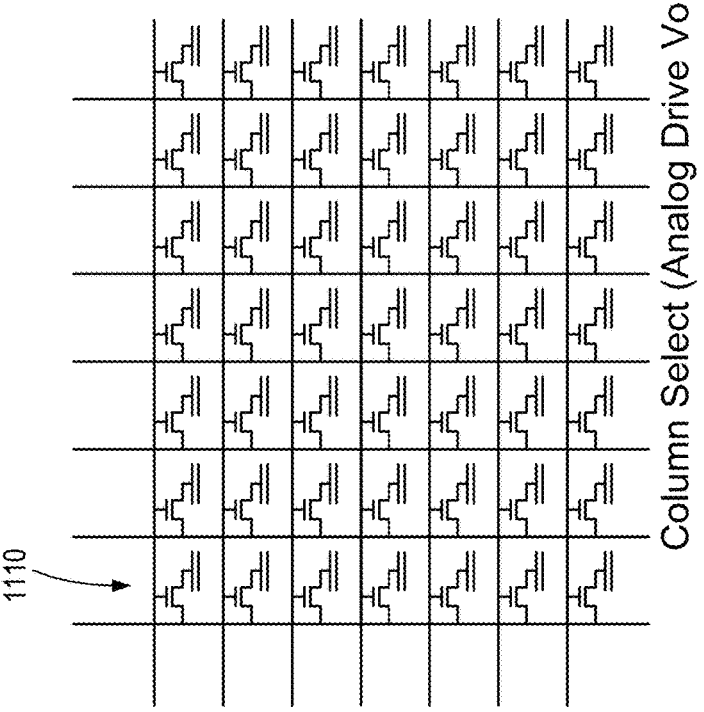
Active matrix
2D, M + N addressing Φ = f(x, y) Arbitrary optical functions
FIG. 11

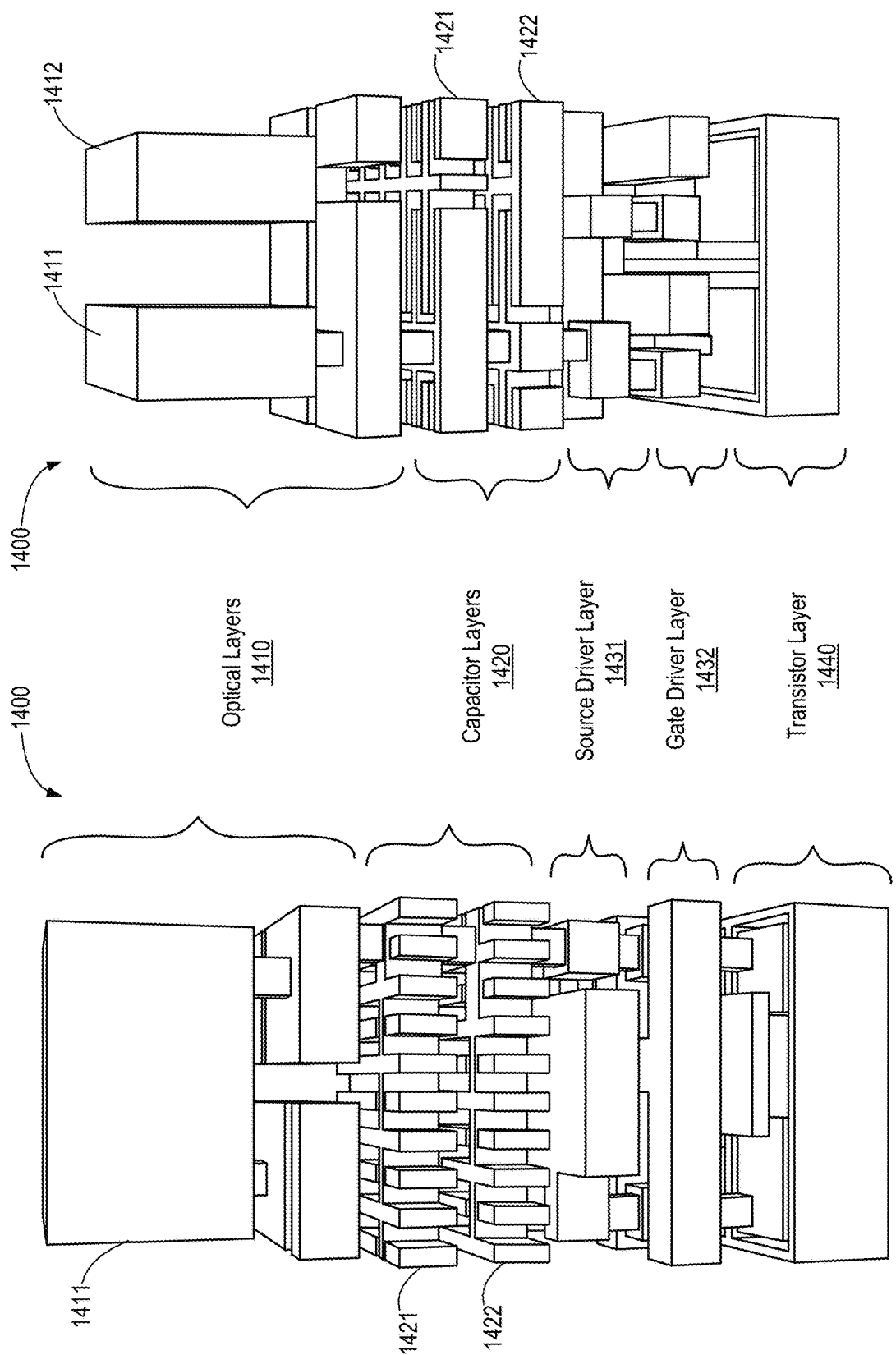

TWO-DIMENSIONAL METASURFACES WITH INTEGRATED CAPACITORS AND ACTIVE-MATRIX DRIVER ROUTING

RELATED APPLICATIONS

Aspects of this patent application can be used in combination with and/or as extensions of the systems, methods, and devices disclosed in U.S. patent application Ser. No. 18/459,310, titled "Two-Dimensional Metasurface Beam Forming Systems and Methods," filed on Aug. 31, 2023, which application is hereby incorporated by reference in its entirety.

TECHNICAL FIELD

This disclosure relates to optical metasurfaces, including tunable resonant optical metasurfaces. This disclosure also relates to two-dimensional row and column matrix addressing schemes.

BRIEF DESCRIPTION OF THE DRAWINGS

FIG. 7B illustrates an example diagram of an off-resonance gap in a reflector layer of the tunable optical metasurface to reduce or eliminate coupling between unit cells, according to one embodiment.

FIG. 11 illustrates an example diagram of a control layer of a two-dimensional optical metasurface with active-matrix addressing and pixel-level storage capacitance, according to one embodiment.

FIG. 14A illustrates a perspective view of a simplified block diagram of a unit cell of an optical metasurface, including two pillars, storage capacitors, source and gate drivers, and transistors, according to one embodiment.

FIG. 14B illustrates another perspective view of the simplified block diagram of the unit cell of the optical metasurface, including the two pillars and the gap therebetween, the storage capacitors, the source and gate drivers, and the transistors, according to one embodiment.

DETAILED DESCRIPTION

Figure 1A:
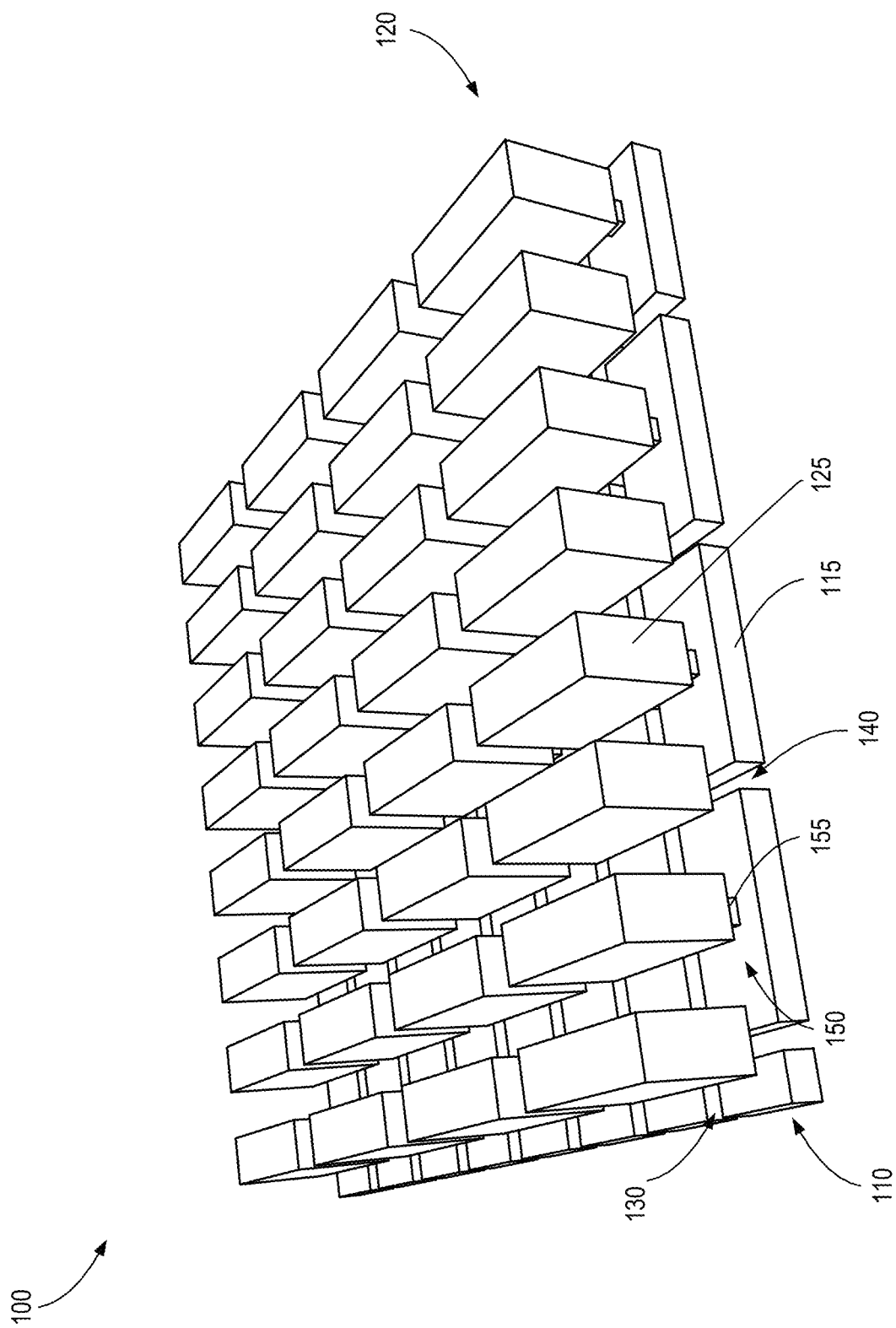
FIG. 1A illustrates a perspective view of a simplified block diagram of reflective and resonator layers of a two-dimensional optical metasurface, according to one embodiment.

Tunable optical metasurfaces can be dynamically tuned to spatially modulate incident optical radiation. Modulating the phase and/or amplitude of incident optical radiation can be used to generate output optical radiation with a target profile. Spatial light modulation may be used for beam shaping, beam forming, beam steering, etc. The presently described systems and methods can be applied to tunable metasurfaces utilizing various architectures and designs to deflect optical radiation within an operational bandwidth. In various embodiments, a controller or metasurface driver selectively applies a pattern of voltages to a two-dimensional array of optical structures positioned on a reflective layer. Voltage differentials across adjacent optical structures modify the refractive indices of dielectric material therebetween. A combination of phase delays created by the pattern of applied voltages can be used to create constructive interference.

Various examples of tunable optical metasurfaces are described herein and depicted in the figures. For example, a tunable optical metasurface can include a two-dimensional array of metallic optical pillars (e.g., antenna elements, elongated pillar elements, metal pillar pairs, etc.). Liquid crystal, or another refractive index tunable dielectric material, is positioned in the gaps or channels between adjacent metallic optical pillars. Liquid crystal is used in many of the examples provided in this disclosure. However, it is appreciated that alternative dielectric materials with tunable refractive indices and/or combinations of different dielectric materials with tunable refractive indices may be utilized instead of liquid crystal in many instances. Examples of suitable tunable dielectric materials that have tunable refractive indices include liquid crystals, electro-optic polymer, electro-optical crystal, chalcogenide glasses, and/or various semiconductor materials.

In various embodiments, biasing the liquid crystal in a metasurface with a pattern of voltage biases changes the reflection phase of the optical radiation. For example, each different voltage pattern applied across the metasurface corresponds to a different reflection phase pattern. Each different reflection phase corresponds to a unique spatial modulation, steering, beamforming, or other controlled optical transmission. A digital or analog controller (controlling current and/or voltage), such as a passive or switch-matrix active driver, may apply a differential voltage bias pattern to achieve a target phase modulation pattern across the two-dimensional array. The metasurface may be controlled for optical spatial modulation to accomplish a target beam shaping, one-dimensional beam steering (i.e., steering in one direction), two-dimensional beam steering (i.e., steering in two directions), wavelength filtering, beam divergence, beam convergence, beam focusing, and/or controlled deflection, refraction, and/or reflection of incident optical radiation.

Additional descriptions, variations, functionalities, and usages for optical metasurfaces are described in U.S. Pat. No. 10,451,800 granted on Oct. 22, 2019, entitled "Plasmonic Surface-Scattering Elements and Metasurfaces for Optical Beam Steering;" U.S. Pat. No. 10,665,953 granted on May 26, 2020, entitled "Tunable Liquid Crystal Metasurfaces;" U.S. Pat. No. 11,092,675 granted on Aug. 17, 2021, entitled "Lidar Systems based on Tunable Optical Metasurfaces;" and U.S. Pat. No. 11,429,008 granted on Aug. 20, 2022, entitled "Liquid Crystal Metasurfaces with Cross-Backplane Optical Reflectors," each of which is hereby incorporated by reference in its entirety.

This disclosure includes various embodiments and variations of tunable optical metasurface devices and methods for manufacturing the same. It is appreciated that the metasurface technologies described herein may incorporate or otherwise leverage prior advancements in surface scattering antennas, such as those described in U.S. Patent Publication No. 2012/0194399, published on Aug. 2, 2012, entitled "Surface Scattering Antennas;" U.S. Patent Publication No. 2019/0285798 published on Sep. 19, 2019, entitled "Plasmonic Surface-Scattering Elements and Metasurfaces for Optical Beam Steering;" and U.S. Patent Publication No. 2018/0241131 published on Aug. 23, 2018, entitled "Optical Surface-Scattering Elements and Metasurfaces;" each of which is hereby incorporated by reference in its entirety. Additional elements, applications, and features of surface scattering antennas are described in U.S. Patent Publication No. 2014/0266946, published Sep. 18, 2014, entitled "Surface Scattering Antenna Improvements;" U.S. Patent Publication No. 2015/0318618, published Nov. 5, 2015, entitled "Surface Scattering Antennas with Lumped Elements;" U.S. Patent Publication No. 2015/0318620 published Nov. 5, 2015, entitled "Curved Surface Scattering Antennas;" U.S. Patent Publication No. 2015/0380828 published on Dec. 31, 2015, entitled "Slotted Surface Scattering Antennas;" U.S. Patent Publication No. 2015/0162658 published Jun. 11, 2015, entitled "Surface Scattering Reflector Antenna;" U.S. Patent Publication No. 2015/0372389 published Dec. 24, 2015, entitled "Modulation Patterns for Surface Scattering Antennas;" PCT Application No. PCT/US18/19269 filed on Feb. 22, 2018, entitled "Control Circuitry and Fabrication Techniques for Optical Metasurfaces," U.S. Patent Publication No. 2019/0301025 published on Oct. 3, 2019, entitled "Fabrication of Metallic Optical Metasurfaces;" and U.S. Publication No. 2018/0248267 published on Aug. 30, 2018, entitled "Optical Beam-Steering Devices and Methods Utilizing Surface Scattering Metasurfaces," each of which is hereby incorporated by reference in its entirety.

In some examples, a tunable optical device includes a substrate layer, a reflective layer, and a two-dimensional array of metallic optical pillars. The two-dimensional array of metallic optical pillars may be arranged in parallel rows extending vertically relative to the substrate layer. In some examples, the width of each pillar along each row is less than one-half of the smallest wavelength of the operational bandwidth and the length of each pillar in a direction perpendicular to each row is less than the smallest wavelength of the operational bandwidth (referred to as subwavelength spacing). In other embodiments, the pillars in each row may be spaced from one another by more than a largest wavelength or many wavelengths of an operational bandwidth.

Gaps between row-adjacent pillars form optical resonators, such that each row of pillars includes a plurality of optical resonator gaps or cavities. A tunable dielectric material that has a tunable refractive index (e.g., liquid crystal) is positioned between the pillars, including within the optical resonators formed by the gaps between row-adjacent pillars. The reflective layer is positioned between the substrate layer and the two-dimensional array of pillars to reflect optical radiation.

The reflective layer may include, for example, a two-dimensional array of elongated rectangular reflector patches arranged in parallel rows. The metasurface may be controlled by a controller. For example, a controller may comprise a passive or active switch-matrix of control lines to selectively apply a voltage differential bias pattern to the tunable dielectric material between adjacent metallic optical pillars.

In various embodiments, the metasurface includes integrated active-matrix driver components and/or integrated storage capacitors to improve responsiveness and performance. The metasurface may include integrated driver routing layers positioned between the substrate layer and the optical resonator layer (e.g., the metallic pillars). The driver routing layers may include a row driver routing layer and a column driver routing layer. The row driver routing layer may include a row conductor for each row of metallic pillars. Similarly, the column driver routing layer may include a column conductor for each column of metallic pillars.

The metasurface may further include an integrated transistor layer with a plurality of transistor devices, wherein each transistor device is connected to and configured to be selectively driven by one of the row conductors and one of the column conductors. Each transistor device may be connected (e.g., electrically connected, but not necessarily in direct contact) to one or more of the metallic pillars (e.g., by conductive vias, traces, integrated wires, or the like). Each transistor device operates to selectively drive a voltage onto the connected metallic pillar(s). For example, each transistor device may be a metal-oxide-semiconductor field-effect transistor (MOSFET). A gate of each MOSFET may be connected to a row conductor associated with the metallic pillar to which each respective transistor device is connected. A controller can "turn on" or activate the transistor devices associated with a row of metallic pillars by driving a voltage (e.g., a digital signal) on the corresponding row conductor.

Each metallic pillar connected to and driven by a transistor device is considered an "active" metallic pillar. In some embodiments, each metallic pillar is connected to at least one of the transistor devices, such that every metallic pillar is an active metallic pillar. In other embodiments, only a subset of the metallic pillars in the two-dimensional array of metallic pillars are connected to transistor devices, such that a subset of the two-dimensional array of metallic pillars are active metallic pillars. Throughout this disclosure, examples and embodiments are described in which all the metallic pillars are active metallic pillars. However, it is understood that the arrays of metallic pillars may include a combination or mixture of active and passive metallic pillars. For the sake of brevity, the active metallic pillars are referred to as simply "metallic pillars," where it is understood that a connection to a transistor device in a transistor layer renders such metallic pillars "active metallic pillars."

The source of each MOSFET may be connected to a column conductor associated with the metallic pillar to which each respective transistor device is connected. The drain of each MOSFET may be connected to each respective metallic pillar, such that when the MOSFET is activated via a row conductor, the source of the same MOSFET may be driven via a corresponding column conductor to drive a voltage onto the metallic pillar. It is appreciated that the column conductors and the row conductors may be switched such that the column conductors are connected to the gates of the various MOSFETs, and the row conductors are connected to the sources of the various MOSFETs. Moreover, while the drawings depict MOSFETs and many of the embodiments described herein utilize MOSFETs as an example transistor device, it is appreciated that a wide variety of switching devices and/or amplifier devices may be utilized instead of or in additional to MOSFETs. As such, a metasurface may include a transistor layer with transistors, amplifiers, and/or other switching devices such as, but not limited to, bipolar junction transistors, cascode amplifiers, diodes, insulated-gate bipolar transistors, junction field effect transistors, MOSFETs, and/or combinations thereof.

According to various embodiments, each metallic pillar in the optical resonator layer is connected in parallel to one (or more) of the storage capacitors in the capacitor layer and one (or more) of the transistor devices in the transistor layer. In some embodiments, multiple metallic pillars may be connected to the same storage capacitor and/or the same transistor device.

The storage capacitor and the metallic pillar are connected in parallel to the "output" of the transistor such that the storage capacitor operates to maintain a voltage level of the metallic pillar in between refresh cycles. Additionally, the storage capacitor operates to maintain a voltage level of the metallic pillar during the switching of the liquid crystal or other tunable dielectric material. The capacitance associated with the metallic pillar connected to the output of a transistor is highly variable based on the orientation of the liquid crystal in the resonant cells formed by the metallic pillar and its row-adjacent metallic pillars. As an example, the electrical permittivity of the liquid crystal, when it is oriented parallel to the walls of the metallic pillar (e.g., copper walls), is approximately $4\varepsilon$, where $\varepsilon$ is the permittivity of free space. However, the electrical permittivity of liquid crystal when it is oriented perpendicular to the walls of the metallic pillars is approximately $20\varepsilon$. Estimating the surface area of the metallic pillars to be approximately 800 nanometers by 600 nanometers with a 250-nanometer gap between adjacent metallic pillars, the capacitance associated with the metallic pillar connected to the output of the transistor may vary from 0.07 femtofarads (fF) to 0.34 femtofarads (fF).

The storage capacitor operates to maintain the voltage level of the metallic pillar in between refresh cycles even as the capacitance of the metallic pillar changes during switching. Any of a wide variety of integrated circuit (e.g., CMOS compatible) capacitor architectures may be utilized, including without limitation metal-insulator-metal (MIM) capacitors, metal-oxide-metal (MOM) capacitors, and/or metal-oxide-semiconductor (MOS) capacitors. In some embodiments, the capacitor layer comprises one or more layers or sublayers of interdigital or interdigitated storage capacitors. It is appreciated that each metallic pillar may be connected to a "single" storage capacitor, but that a "single" storage capacitor may include one or more discrete capacitors connected in series and/or parallel. In some embodiments, the capacitor layer is integrated within the same layer as the transistor layer (e.g., the transistor layer and the capacitor layer are the same layer). For example, each of the plurality of storage capacitors may be a trench capacitor formed in the transistor layer adjacent to one of the transistor devices.

In some embodiments, the storage capacitors in the capacitor layer are grounded. That is, one terminal or connection end of the storage capacitor is connected to ground, while the second terminal or other connection end of the storage capacitor is connected to the metallic pillar (e.g., in parallel with the connection between the drain of a MOSFET and the metallic pillar). In other embodiments, the storage capacitors in the capacitor layer are connected in a differential configuration with the storage capacitors associated with adjacent metallic pillars. The exact capacitance of the storage capacitors may be adjusted for a particular operational configuration, target switching performance, inherent capacitance of the metallic pillars, voltage range, refresh rates, leakage current, and refresh cycle times. In some example embodiments, each storage capacitor has a capacitance between 0.1 femtofarads (fF) and 3.0 femtofarads (f F).

As described herein, a controller may selectively apply a pattern of voltages to the metallic pillars to attain a target phase modulation profile. The pattern of voltages may be applied to the metallic pillars using an active switch-matrix driver configuration or simply an "active-matrix" configuration that operates to sequentially drive a voltage on each row conductor to temporarily activate the transistor devices of the row of metallic pillars associated therewith. The controller may sequentially activate the transistor devices of each row according to a refresh rate with a duration between 25 microseconds and 100 microseconds (e.g., 50 microseconds). For example, the controller may drive a digital voltage signal to a gate of every transistor device connected to the row conductor. During the refresh cycle time of each row of transistor devices, the controller drives each column conductor to apply a target voltage to each metallic pillar (and connected storage capacitor) in the row of metallic pillars associated with the temporarily activated transistor devices. For example, the controller may drive a pattern of analog voltage on the column conductors to drive each metallic pillar to a target voltage.

While an example refresh rate of 50 microseconds is described herein, faster refresh rates may be utilized in some embodiments. Similarly, slower refresh rates greater than 100 microseconds may be suitable or even preferred in situations when slow switching speeds are acceptable and/or reduced power consumption is prioritized. The refresh cycle time may be determined as a function of the time required to drive the voltage onto the metallic pillar and charge the storage capacitor. In some embodiments, the tunable dielectric material may take as long as 50 or even 100 microseconds to rotate. As such, faster refresh rates may not correspond to faster device switching speeds. The refresh rate may be selected as a function of the capacitance of the storage capacitor connected to each metallic pillar, applicable leakage currents, a target rotation time of the tunable dielectric material, target switching speeds, and the like. In general, larger storage capacitance values allow for slow refresh rates. In one example embodiment, a metasurface is designed to achieve 90% rotation of liquid crystal within the resonators in less than 100 microseconds. The metasurface includes an integrated capacitor layer with individual storage capacitors (e.g., interdigitated capacitors in one or more sublayers) with capacitance values between 0.1 femtofarads (fF) and 1.0 femtofarads (fF). The controller is configured to apply the pattern of voltages to the metallic pillars with a refresh rate between 25 microseconds and 100 microseconds (e.g., 50 microseconds).

In some embodiments, a metasurface may comprise a plurality of tiles, where each tile of the metasurface includes a distinct or interconnected active-matrix driver and/or integrated storage capacitors. A controller may drive each tile the same or each tile independently by driving the individual row and column conductors connected to the integrated transistors of each metasurface tile. The presently described integrated capacitors and/or driver routing layers may be utilized in the tiled architectures described in U.S. Pat. No. 11,493,823 entitled "Integrated Driver and Heat Control Circuitry in Tunable Optical Devices," granted on Nov. 8, 2022, and U.S. Pat. No. 11,487,184 entitled "Integrated Driver and Self-Test Control Circuitry in Tunable Optical Devices," granted on Nov. 1, 2022, which applications are hereby incorporated by reference in their entireties. For example, integrated driver routing layers and/or capacitors may be utilized in conjunction with various tiled architectures that utilize multiplexors, built-in self-test circuits, external drivers, integrated drivers, switching circuitry, and the like.

An active switch-matrix controller may be switchable to individually control each metal optical structure of the metasurface. For example, each control output of the active switch-matrix controller may be dynamically switched to control a different control input of a tiled metasurface. The active switch-matrix controller may, for example, utilize AND gates, OR gates, multiplexer digital logic gates, inverse multiplexer digital logic gates, and/or other switching elements to dynamically address any number of individual optical structures or tiles of optical structures. Accordingly, the two-dimensional array of metallic pillars described herein may be arranged in a two-dimensional tiled configuration with T metasurface tiles arranged in R rows of metasurface tiles and S columns of metasurface tiles, wherein each metasurface tile includes a two-dimensional arrangement of N metallic pillars in rows and M columns, where T, R, S, N, and M are integer values.

In another conceptualization, a two-dimensional metasurface of metallic pillars described herein may be understood to represent one tile of a multi-tiled metasurface. For example, a metasurface device described herein may be replicated in a one-dimensional array of tiles or a two-dimensional array of tiles to form a multi-tile metasurface. Each tile may be uniquely driven or, as described in the references incorporated herein by reference, the metallic pillars of each tile may be commonly drive or driven by active switch-matrix drivers.

Examples of metasurfaces are described herein that can be used for transmitting or receiving. Systems incorporating the metasurfaces described herein may be operated as only a transmitter, as only a receiver, simultaneously as a transmitter and receiver, as a time-multiplexed transmitter/receiver, as a frequency-multiplexed transmitter/receiver, with the first metasurface acting as a transmitter and a second metasurface acting as a receiver, or in another transmit/receive configuration or operation technique. The metasurfaces described herein may be used to control, tune, or modify reflection phase patterns. For example, one or more metasurfaces may be used to control (i) the reflection phase, (ii) the reflection amplitude, or (iii) the reflection phase and the reflection/transmission amplitude of an optical signal. Accordingly, a metasurface may be utilized in any of the embodiments described herein to control the complex phase and/or complex amplitude of reflected optical radiation.

Any of the variously described embodiments herein may be manufactured with dimensions suitable for optical bandwidths for optical sensing systems such as LiDAR, optical communications systems, optical computing systems, and displays. For example, the systems and methods described herein can be configured with metasurfaces that operate with optical radiation, including without limitation optical wavelengths in the near-infrared, mid-infrared, long wave-infrared, and/or visible-wavelength ranges. Given the feature sizes needed for sub-wavelength optical antennas and antenna spacings, the described metasurfaces may be manufactured using micro-lithographic and/or nano-lithographic processes, such as fabrication methods commonly used to manufacture complementary metal-oxide-semiconductor (CMOS) integrated circuits.

Some of the infrastructure that can be used with embodiments disclosed herein is already available, such as general-purpose computers, computer programming tools and techniques, digital storage media, and communication links. Many of the systems, subsystems, modules, components, and the like that are described herein may be implemented as hardware, firmware, and/or software. Various systems, subsystems, modules, and components are described in terms of the function(s) they perform because such a wide variety of possible implementations exist. For example, it is appreciated that many existing programming languages, hardware devices, frequency bands, circuits, software platforms, networking infrastructures, and/or data stores may be utilized alone or in combination to implement a specific control function.

It is also appreciated that two or more of the elements, devices, systems, subsystems, components, modules, etc. that are described herein may be combined as a single element, device, system, subsystem, module, or component. Moreover, many of the elements, devices, systems, subsystems, components, and modules may be duplicated or further divided into discrete elements, devices, systems, subsystems, components, or modules to perform subtasks of those described herein. Any aspect of any embodiment described herein may be combined with any other aspect of any other embodiment described herein or in the other disclosures incorporated by reference, including all permutations and combinations thereof, consistent with the understanding of one of skill in the art reading this disclosure in the context of such other disclosures.

To the extent used herein, a computing device, system, subsystem, module, driver, or controller may include a processor, such as a microprocessor, a microcontroller, logic circuitry, or the like. A processor may include one or more special-purpose processing devices, such as application-specific integrated circuits (ASICs), programmable array logic (PAL), programmable logic array (PLA), a programmable logic device (PLD), field-programmable gate array (FPGA), or another customizable and/or programmable device. The computing device may also include a machine-readable storage device, such as non-volatile memory, optical memory, flash memory, or another transitory or non-transitory machine-readable storage media. Various aspects of some embodiments may be implemented or enhanced using hardware, software, firmware, or a combination thereof.

The components of some of the disclosed embodiments are described and illustrated in the figures herein to provide specific examples. Many portions thereof could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure.

FIG. 1A illustrates a perspective view of a simplified block diagram of a reflective layer 110 and resonator layer 120 of a two-dimensional optical metasurface 100, according to one embodiment. As illustrated, the resonator layer 120 includes a two-dimensional array of metallic optical pillars 125 arranged in parallel rows. Each pillar 125 in the resonator layer 120 extends vertically relative to an underlying substrate layer (not shown). The pillars 125 in each row may be spaced from one another by less than a smallest wavelength in an operational bandwidth. The width (W) of each pillar 125 along each row may be less than one-half of the smallest wavelength of the operational bandwidth. The length (L) of each pillar 125 in a direction perpendicular to each row (e.g., along the columns) may be less than the smallest wavelength of the operational bandwidth.

The gaps between adjacent pillars 125 in each row of pillars form optical resonators. A tunable dielectric material may be deposited within the resonator layer to fill the space between the pillars 125 in all directions, such that tunable dielectric material is positioned within the optical resonators formed by the gaps between row-adjacent pillars 125. Examples of suitable tunable dielectric materials that have tunable refractive indices include liquid crystals, electro-optic polymer, electro-optic crystals, chalcogenide glasses, and/or various semiconductor materials.

In alternative embodiments, the pillars 125 in each row may be spaced from one another by more than a wavelength in an operational bandwidth (e.g., ten times the largest wavelength in the operational bandwidth. Similarly, in some embodiments, the width (W) of each pillar 125 along each row may be more than one-half of the smallest wavelength, and the length (L) of each pillar 125 in a direction perpendicular to each row (e.g., along the columns) may be many times larger than the largest wavelength of the operational bandwidth.

The reflective layer 110 includes a two-dimensional array of elongated rectangular reflector patches 115 extending lengthwise along parallel rows. That is, as illustrated, the reflector patches 115 extend lengthwise in a direction that is perpendicular with respect to the lengthwise direction of the pillars 125. An electrical isolation gap 130 separates reflector patches 115 in adjacent rows. An off-resonance gap 140 separates adjacent reflector patches 115 in the same row. The direction of the electrical isolation gap 130 is off-resonance with the incident electric field so there is no resonant coupling. The off-resonance gap 140 between adjacent reflector patches 115 is perpendicular to the incident electrical field. Accordingly, the dimension of the off-resonance gap 140 is selected to minimize or avoid any possible resonance between reflector patches 115 in the same row, for a range of optical radiation wavelengths. The off-resonance gap 140 may be a different size than the electrical isolation gap 130.

A dielectric via layer 150 may be positioned between the reflective layer 110 and the resonator layer 120. Each pillar 125 may be electrically connected to one underlying reflector patch 115 by a conductor via 155 within the dielectric via layer 150. The dielectric of the dielectric via layer 150 has been removed from the figure for clarity to show the positioning of the conductor vias 155.

Figure 1B:
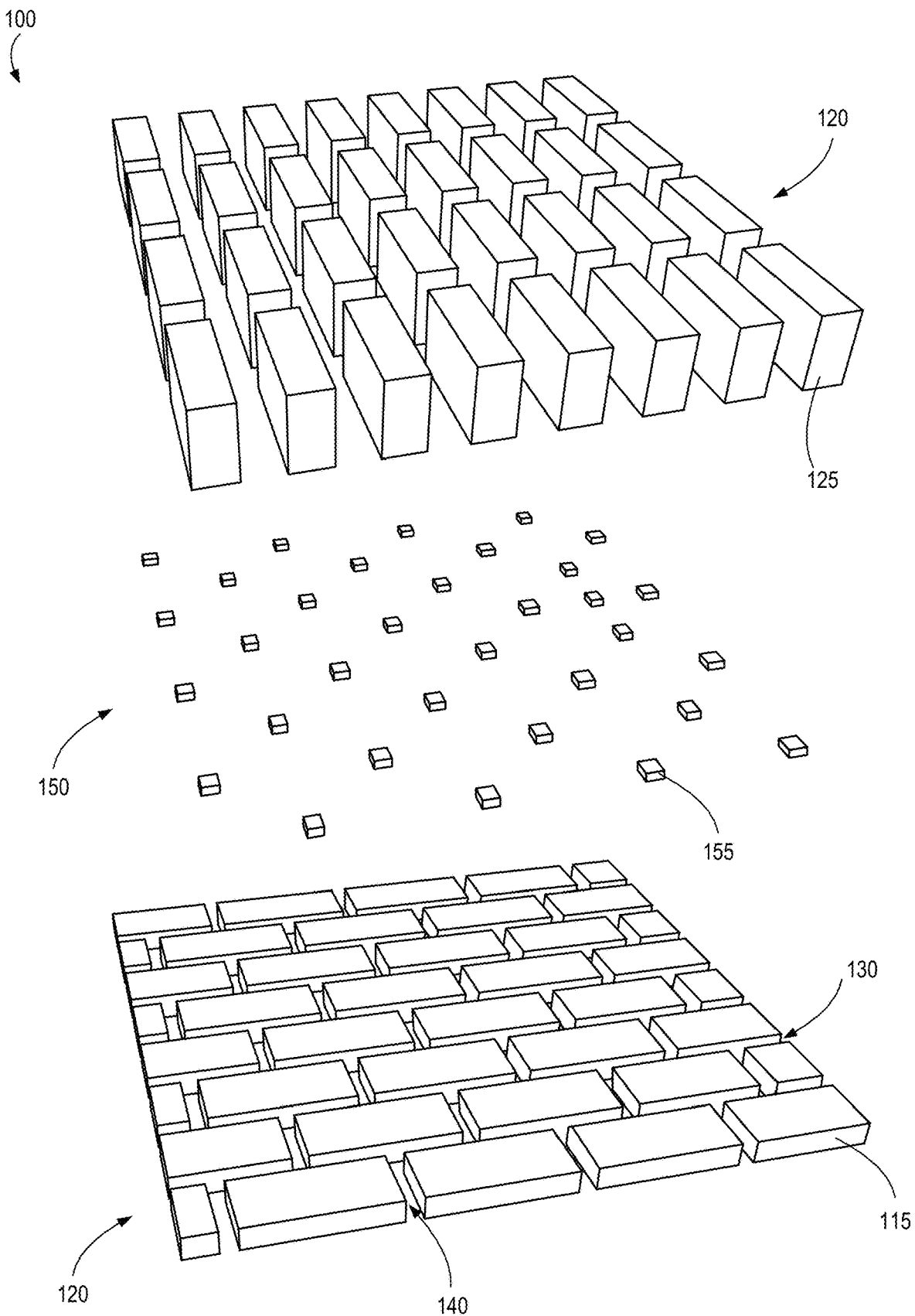
FIG. 1B illustrates an exploded perspective view of the simplified block diagram of the reflective and resonator layers of the two-dimensional optical metasurface, according to one embodiment.

FIG. 1B illustrates an exploded perspective view of the simplified block diagram of the reflective layer 110 and the resonant layer 120 of the two-dimensional optical metasurface 100. As illustrated, the parallel rows of reflector patches 115 are offset with respect to one another, such that the off-resonance gaps 140 between adjacent reflector patches 115 in one row are not aligned (e.g., staggered or misaligned) with the off-resonance gaps 140 between adjacent reflector patches 115 in an adjacent row. Each conductor via 155 of the dielectric via layer 150 (shown with the dielectric material removed from around the conductor vias 155 removed) connects one pillar 125 to one of the underlying reflector patches 115. Notably, since the pillars 125 extend lengthwise in a direction perpendicular to the direction in which the underlying reflector patches 115 extend, half of the pillars 125 (alternating every other one) in the first row of pillars 125 are connected to reflector patches 115 in the first row of reflector patches 115, while the other half (alternating) are connected to reflector patches 115 in the second row of reflector patches 115.

Figure 1C:
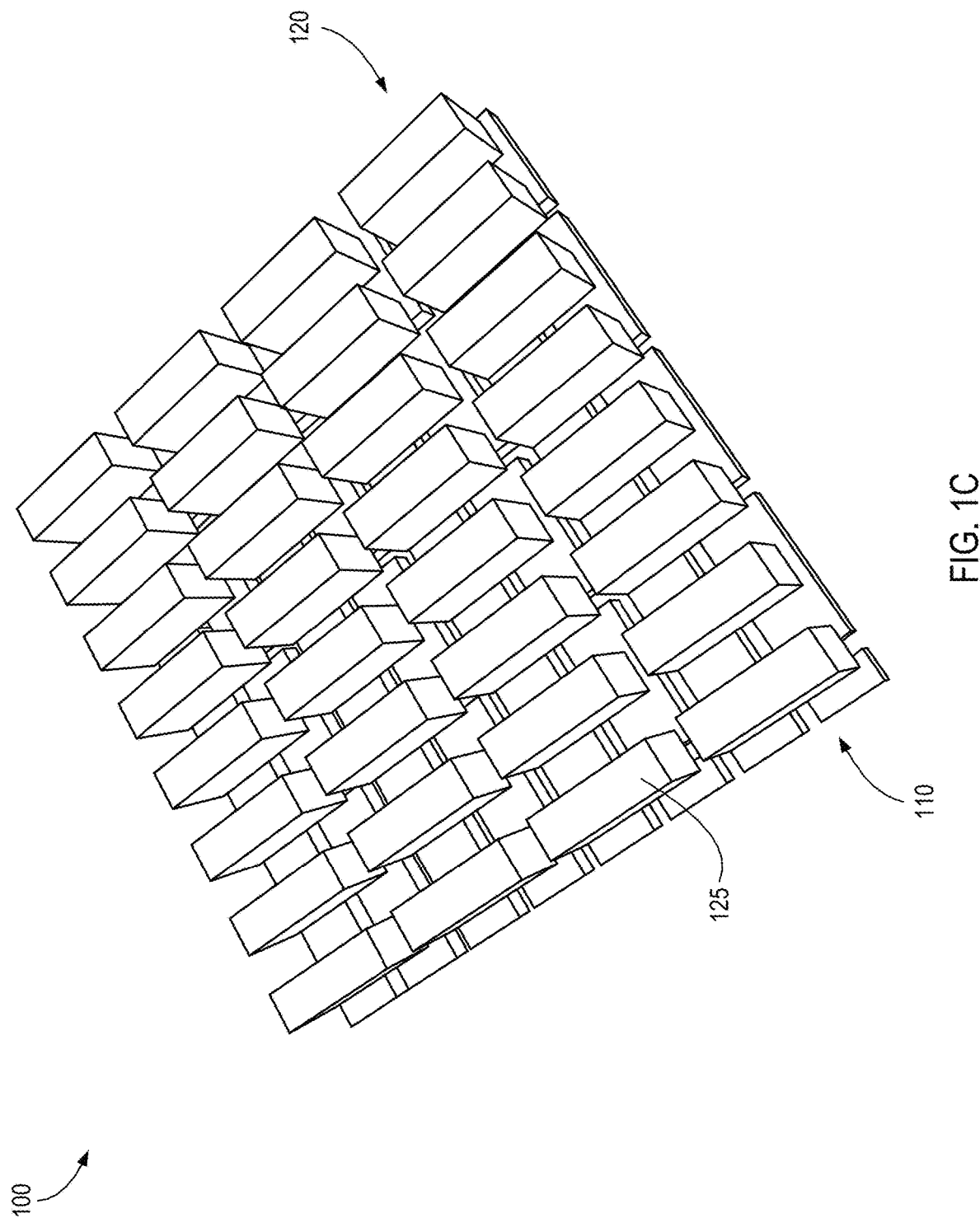
FIG. 1C illustrates a top perspective view of the simplified block diagram of the reflective and resonator layers of the two-dimensional optical metasurface, according to one embodiment.

FIG. 1C illustrates a top perspective view of the simplified block diagram of the reflective layer 110 and the resonant layer 120 of the two-dimensional optical metasurface 100. The top perspective view illustrates that the pillars 125 are aligned in rows and columns, with the pillars extending lengthwise in a first direction (e.g., perpendicular to the angle of the incident optical radiation). In the illustrated example, the length of each pillar 125 is less than the smallest wavelength of an operational bandwidth, and the width of each pillar 125 is less than one-half of the smallest. The gap between adjacent pillars 125 in the same row also has subwavelength dimensions. As described herein, the length, width, and spacing dimensions may be larger in some embodiments.

The specific dimensions of the pillars 125, including the heights and interelement spacing (gaps), are selected as a function of the target operational bandwidth, as described in detail in the patents and patent publications incorporated herein by reference. For example, for operation with optical radiation having a wavelength of 905 nanometers, the gap filled with the tunable dielectric material between adjacent pillars 125 forming a unit cell may be approximately 150 nanometers. The height of the pillars 125 may be approximately 400 nanometers and provide a second-order resonance.

Figure 1D:
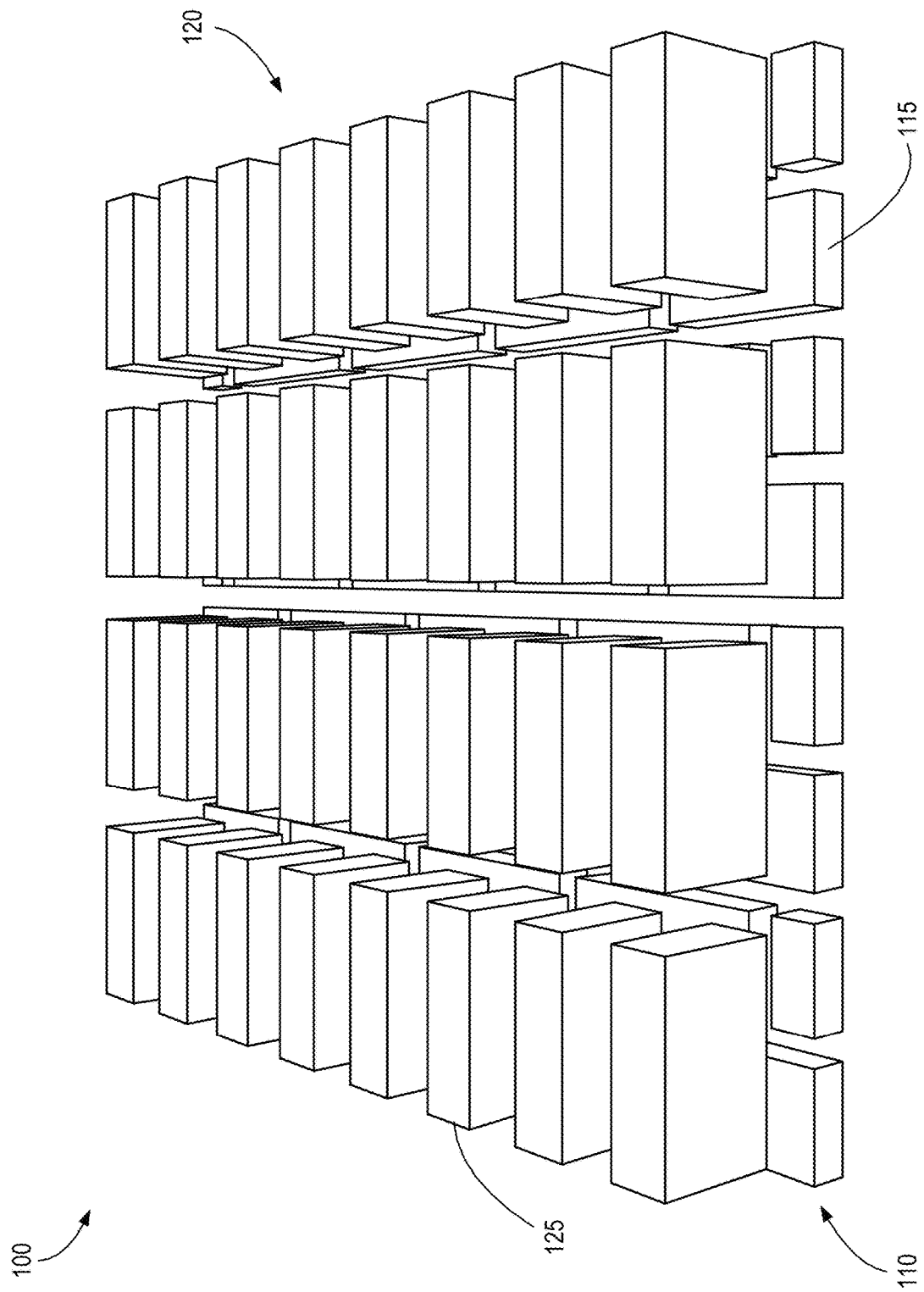
FIG. 1D illustrates a side perspective view of the simplified block diagram of the reflective and resonator layers of the two-dimensional optical metasurface, according to one embodiment.

FIG. 1D illustrates a side perspective view of the simplified block diagram of the reflective layer 110 and the resonant layer 120 of the two-dimensional optical metasurface 100. The illustrated view is rotated such that the rows of reflector patches 115 and pillars 125 extend from the bottom of the page toward the top of the page. As previously described, the reflector patches 115 extend lengthwise in the direction of the rows, while the pillars 125 extend widthwise in the direction of the rows. The relative dimensions of the individual pillars 125 and reflector patches 115 are selected such that there are two rows of reflector patches 115 beneath each row of pillars 125.

Figure 2:
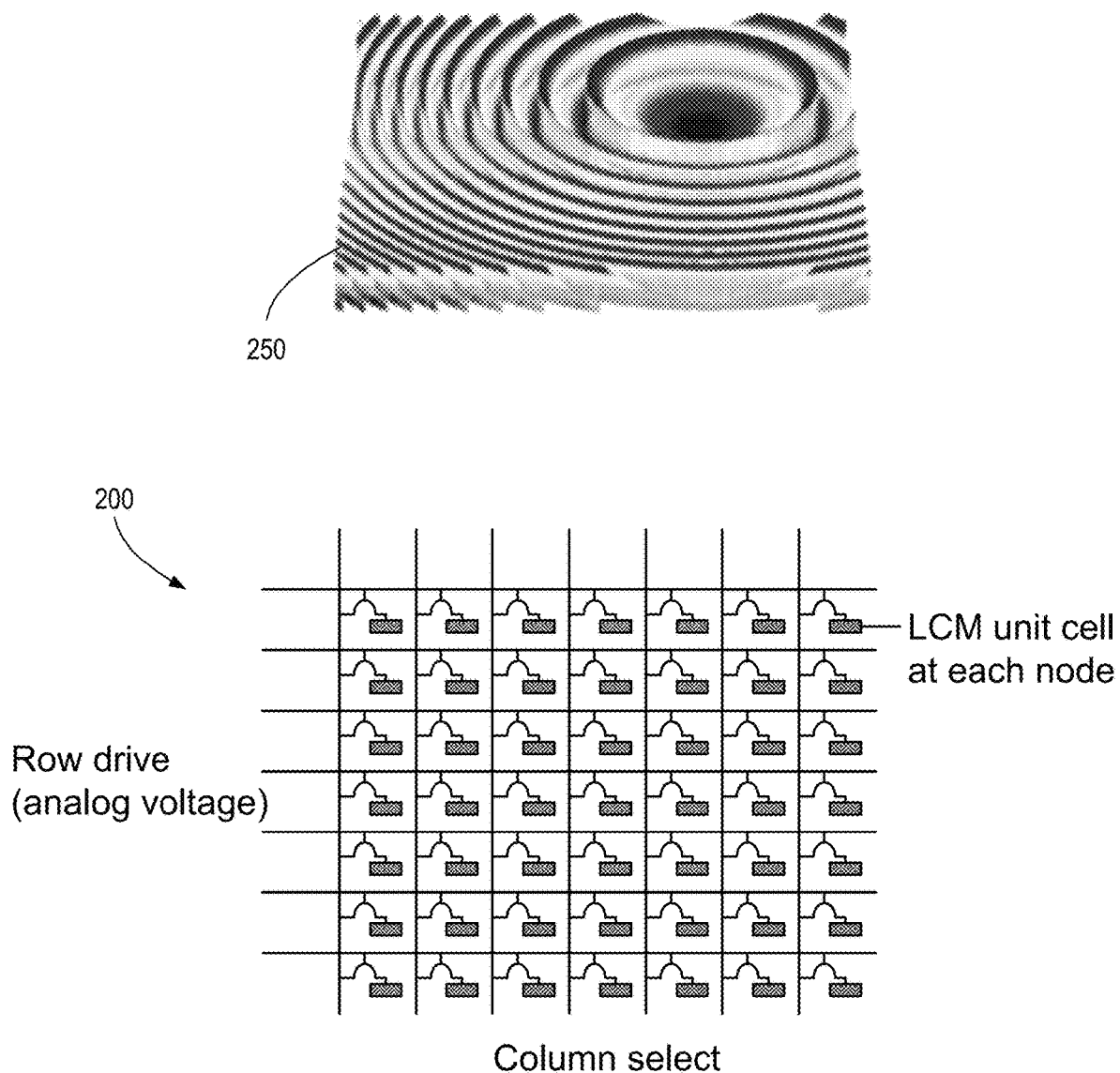
FIG. 2 illustrates an example diagram of a control layer of a two-dimensional optical metasurface with active matrix addressing, according to one embodiment.

FIG. 2 illustrates an example diagram of a control layer 200 of a two-dimensional optical metasurface with active matrix addressing, according to one embodiment. The active-matrix control system includes rows and columns of transistor devices. Each transistor device is connected to a unique metallic optical pillar through a corresponding reflector patch and conductor via. The control lines of the control layer 200 may be integrated within the substrate of a metasurface or within a separate dielectric layer between the substrate and the reflective layer. The active-matrix control system may drive a voltage on one or more columns and use row-select lines to turn on the transistor devices associated with specific pillars. The active matrix architecture enables the resonant unit cells of the metasurface to exhibit a unique pattern of phase responses ($\phi$) as a function of the row drive (x) and the column select (y), expressible as $\phi=f(x,y)$, as illustrated at 250.

Figure 3:
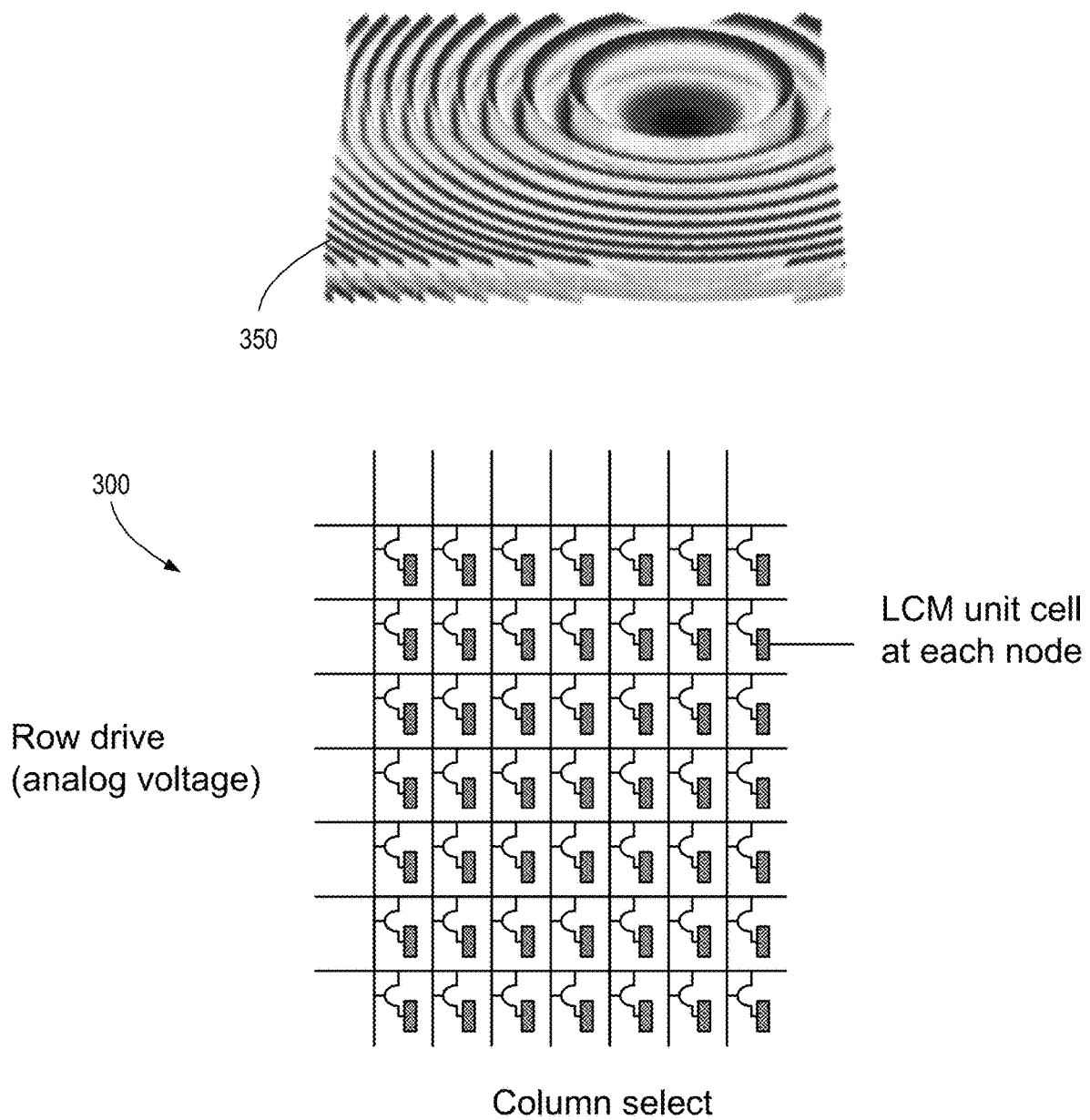
FIG. 3 illustrates another example diagram of a control layer of a two-dimensional optical metasurface with active matrix addressing, according to one embodiment.

FIG. 3 illustrates an example diagram of a control layer 300 of a two-dimensional optical metasurface with active matrix addressing, according to one embodiment. The active-matrix control system includes rows and columns of transistor devices. Each transistor device is connected to a unique metallic optical pillar through a corresponding reflector patch and conductor via. The control lines of the control layer 300 may be integrated within the substrate of a metasurface or within a separate dielectric layer between the substrate and the reflective layer. The active-matrix control system may drive a voltage on one or more rows and use column-select lines to turn on the transistor devices associated with specific pillars. The active matrix architecture enables the resonant unit cells of the metasurface to exhibit a unique pattern of phase responses ($\phi$) as a function of the row drive (x) and the column select (y), expressible as $\phi=f(x,y)$, as illustrated at 350.

As described herein, each resonant unit cell includes two metallic optical pillars spaced apart by a subwavelength gap that is filled (partially, fully, or overflowing) with a tunable dielectric material that has a tunable refractive index. The tunable refractive index of the tunable dielectric material of each resonant unit cell is selected by creating a voltage differential between the two metallic optical pillars of the unit cell. The voltage differential is used to tune the phase (and/or amplitude) of incident optical radiation (e.g., laser light). Each resonant unit cell can be less than half of the optical wavelength in size in the in-plane direction of the incident optical radiation to enable large field-of-view beam steering without grating lobes. Configuring the dimensions of the resonant unit cell (e.g., the widths of two metallic optical pillars and the gap therebetween) to be less than one-half of the wavelength ($\lambda/2$) in the in-plane direction of the incident optical radiation prevents diffraction from the resonant unit cell. The dimensions of the resonant unit cell can be larger (e.g., up to as large as the wavelength) in the out-of-plane or lateral direction while still maintaining a large beam steering field of view without introducing diffraction. The unit cell size can be relaxed (e.g., have dimensions that are larger than one-half of the wavelength ($\lambda/2$) in the in-plane direction and/or more than one wavelength in the out-of-plane or lateral direction) in applications in which the incidence angle is close to normal to the plane of the metasurface.

Figure 4:
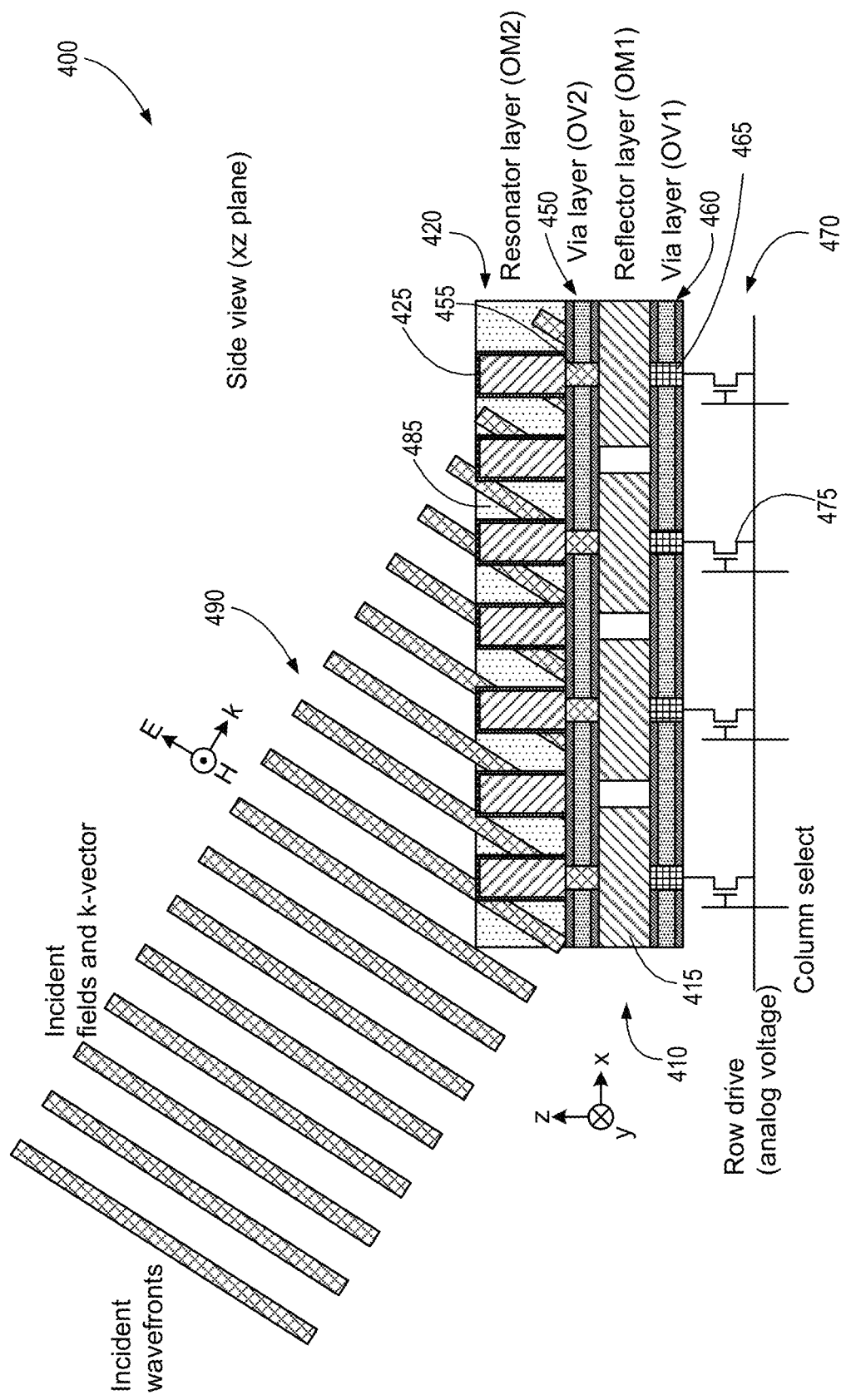
FIG. 4 illustrates a side-view diagram of the layers of a portion of a tunable optical metasurface, according to one embodiment.

FIG. 4 illustrates a side-view diagram of the layers of a portion of a tunable optical metasurface 400 with active-matrix addressing, according to one embodiment. In the illustrated cross-sectional view, a single row of optical resonators is formed by the metallic optical pillars 425 in the resonator layer 420. The pillars 425 extend vertically relative to a substrate layer (not shown) and lengthwise into the page. A dielectric via layer 450 includes conductor vias 455 that connect the pillars 425 to reflector patches 415 within a reflective layer 410. As illustrated, the reflector patches 415 are staggered or offset with respect to one another such that the reflector patches 415 for every other pillar 425 are not visible in the cross-sectional view. The illustrated example includes a second via layer 460 with conductor vias 465 to connect the pillars 425 to the control lines and transistors 475 within the control layer 470.

The active matrix architecture enables the resonant unit cells of the metasurface 400 to exhibit a unique pattern of phase responses ($\phi$) as a function of the row drive (x) and the column select (y), expressible as $\phi=f(x,y)$. The incident fields and k-vector of the wavefront of the optical radiation 490 are depicted. Any incidence angle onto the metasurface can be used and the incident optical radiation is not limited to plane waves. The metasurface 400 may be used for arbitrary phase modulation of the incident optical radiation 490 for beam steering, lensing, or another optical functionality.

As illustrated, the active matrix addressing scheme includes a transistor 475 beneath each resonant unit cell. In some embodiments, each resonant unit cell includes only a single transistor connected to one of the pillars, with the other pillar connected to a fixed voltage. In other embodiments, each resonant unit cell includes two transistors, with one transistor connected to each metallic optical pillar such that each metallic optical pillar can be driven with a unique voltage. While an absolute voltage is applied to each metallic optical pillar, the phase of each resonant unit cell depends on the voltage difference between adjacent metallic optical pillars.

According to various embodiments, the dielectric via layer 450 also functions as a waveguide layer in between the resonator layer 420 and the reflector layer 410. The thickness of the waveguide layer is such that destructive interference of the fields is created at the bottom of the optical resonator (e.g., the gap between row-adjacent optical metallic pillars), thus confining most of the optical energy to the vertical pillars with minimal leaking into the waveguide layer.

The resonant unit cells are tuned via the refractive-index tunable material 485 between adjacent metallic optical pillars 425. Liquid crystal, for example, may be used, which has a high refractive index tuning range. As described herein, a differential voltage is applied between adjacent metallic optical pillars 425, which rotates the liquid crystals in that resonant unit cell, changing the refractive index experienced by the x component of the optical electric field. This consequently changes the effective length of the metallic optical pillars 425, and hence the phase experienced by the incident optical radiation 490 at that location on the metasurface. Since the resonant unit cells are resonant, changes in the phase are coupled to changes in the amplitude response in many embodiments, as is typical of Lorentz-type resonators. In such embodiments, each metallic optical pillar 425 is programmed with a unique voltage differential (hence phase) such that a desired spatial phase gradient is achieved. This gradient can be used for beam steering or other optical functionality such as focusing, collimating, or any arbitrary optical transformation.

Again, the metallic optical pillars 425 can be implemented in conventional CMOS manufacturing processes, such as those based on copper damascene metallization, deposition processes, etching processes, lithography processes, patterning processes, chemical mechanical planarization processes, and the like. Other metals besides copper, such as aluminum, silver, silver-coated copper, and gold, can also be used to form the metal core of each metallic optical pillar. Copper is attractive because it is widely used in the semiconductor industry to make transistors interconnects with the dimensions required to implement these resonant unit cells. In addition, copper has excellent optical properties across near-IR and short-wave IR wavelengths.

Figure 5A:
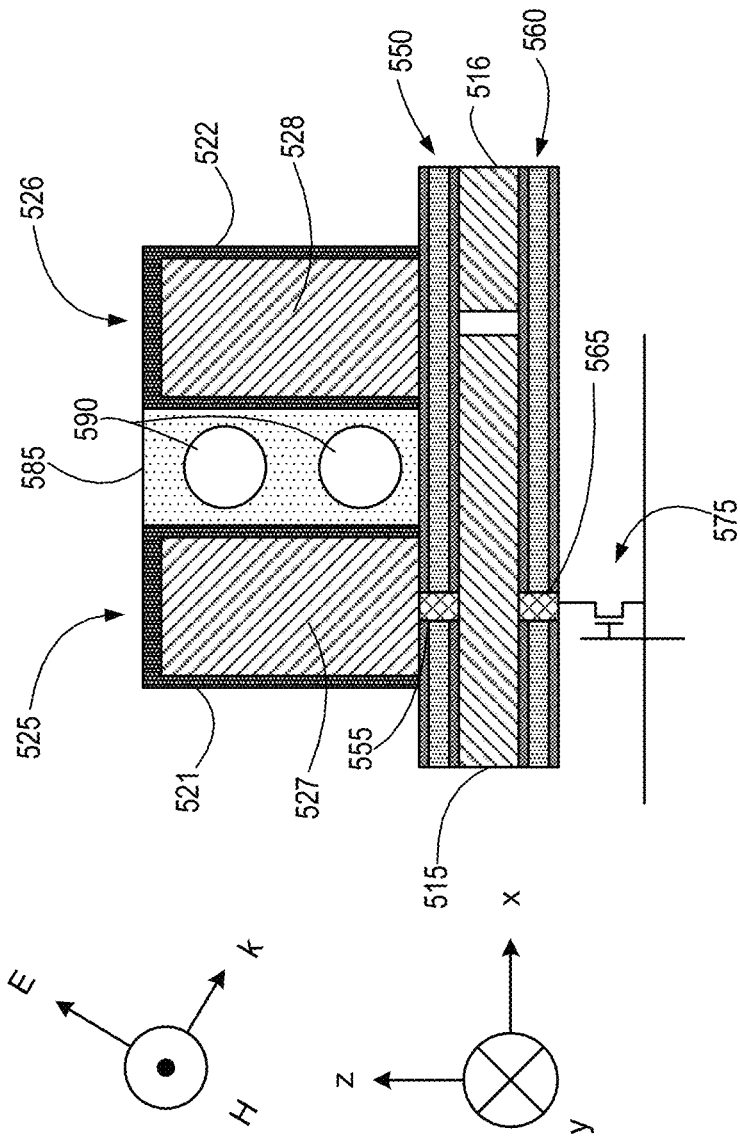
FIG. 5A illustrates an example diagram of optical fields in an optical resonator of a resonator layer of a tunable optical metasurface, according to one embodiment.

FIG. 5A illustrates an example diagram of optical fields 590 within the tunable dielectric material 585 in the gap between a pair of metallic optical pillars 525 and 526 forming an optical resonator, with underlying reflector patches 515 and 516. In the illustrated example, the heights of the metallic optical pillars 525 and 526 are selected for second-order resonance with two magnetic field anti-nodes 590. According to various embodiments, and as illustrated, each metallic optical pillar 525 and 526 includes a metal core 527 and 528 and a passivation coating 521 and 522.

The passivation coating 521 and 522 may be deposited as a single or uniform layer that covers the sidewalls and top wall of each metallic optical pillar 525. The passivation coating 521 and 522 may be, for example, a thin silicon nitride (SiN) layer to passivate a metal core 527 and 528 of each metallic optical pillar 525. The passivation coating 521 and 522 may operate to prevent diffusion of the metal of the metallic optical pillars 525 and 526 from diffusing into the tunable dielectric material (e.g., liquid crystal) and/or prevent corrosion of the metallic optical pillars 525 and 526. The passivating coating 521 and 522 may be SiN, SiCN, aluminum oxide, or another suitable passivation material.

The passivation coating 521 and 522 may be optically transparent for wavelengths within the operational bandwidth of the metasurface and/or reflective to complement the underlying reflective conductive metal core 527 and 528 (e.g., copper). The passivation coating 521 and 522 may alternatively (or additionally) include silicon carbide nitride, silicon carbide, aluminum oxide ($AlO_x$), hafnium oxide ($HfO_2$, silicon oxide ($SiO_2$), aluminum nitride (AlN), boron nitride (BN), and/or another passivating dielectric material. A transistor 575 within a control layer is connected to the pillar 525 via the reflector patch 515 and the intervening conductor vias 555 and 565 within the dielectric via layers 550 and 560. A controller can drive the pillar 525 to a target voltage via the transistor 575 to create a voltage differential within the optical resonator formed by the gap between pillars 525 and 526. The refractive index of the tunable dielectric material 585 may be adjusted to a target refractive index based on the applied voltage differential between the pillars 525 and 526.

Figure 5B:
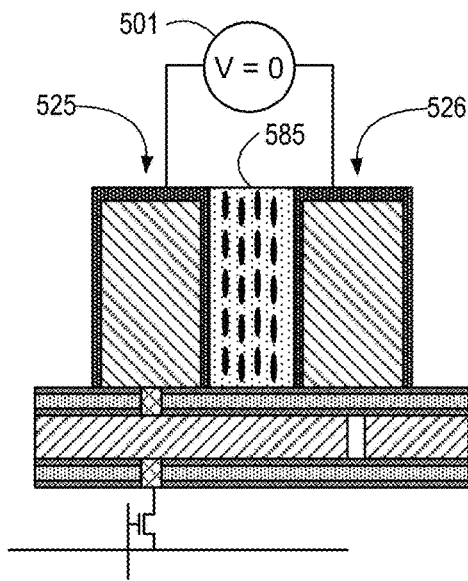
FIG. 5B illustrates the tunable dielectric material between two pillars aligned in a first direction to provide a first refractive index without any applied voltage, according to one embodiment.

FIG. 5B illustrates the tunable dielectric material 585 between two pillars 525 and 526 aligned in a first direction to provide a first refractive index within the optical resonator without any applied voltage (e.g., zero-volt differential, at 501), according to one embodiment.

Figure 5C:
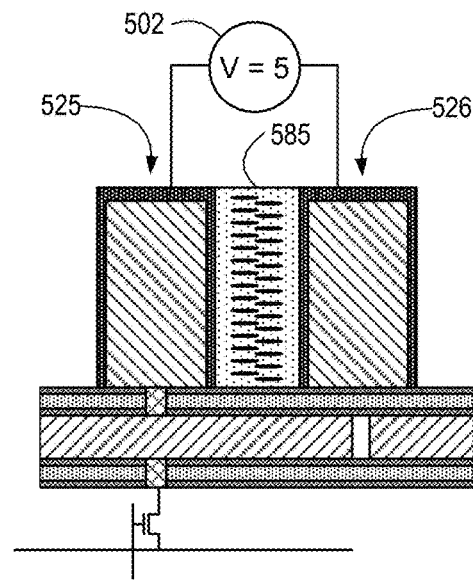
FIG. 5C illustrates the tunable dielectric material between the pillars aligned in a second direction to provide a second refractive index with an applied voltage of 5 volts, according to one embodiment.

FIG. 5C illustrates the tunable dielectric material 585 between the pillars 525 and 526 aligned in a second direction to provide a second refractive index within the optical resonator with an applied voltage of 5 volts, at 502, according to one embodiment.

Figure 5D:
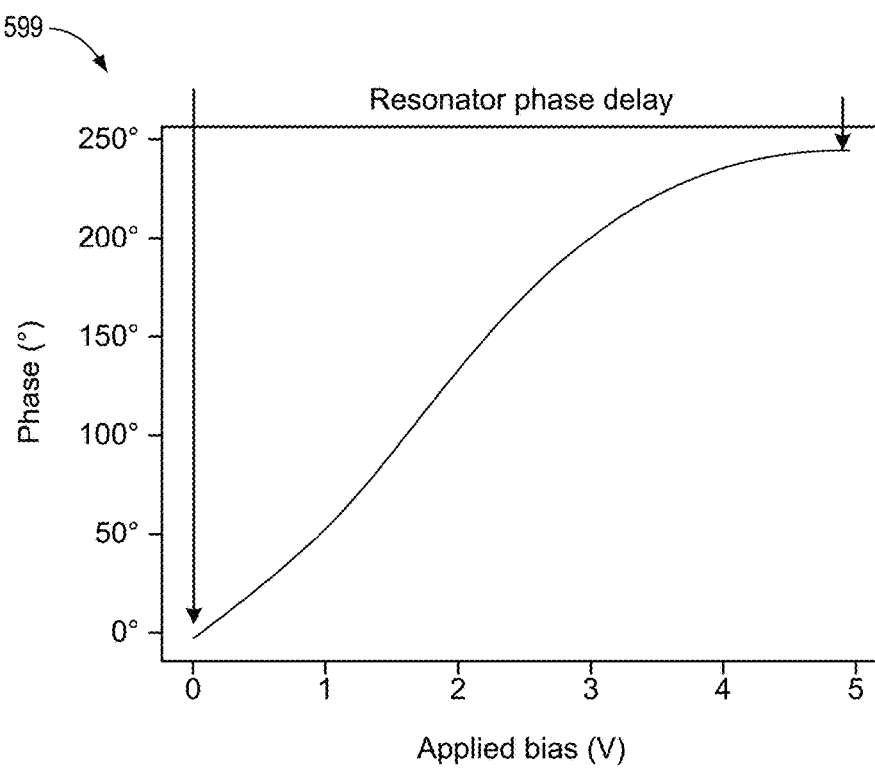
FIG. 5D illustrates a graph of a phase response of the resonant unit cell with respect to applied voltage values, according to one embodiment.

FIG. 5D illustrates a graph 599 of a phase response of the resonant unit cell with respect to applied voltage values, according to one embodiment. It is appreciated that the phase response and range of voltages may vary based on the specific dimensions of the pillars 525 and 526, the width of the gap forming the optical resonator that is filled with the tunable dielectric material 585, and/or the specific material (e.g., liquid crystal) used as the tunable dielectric material 585.

Figure 6A:
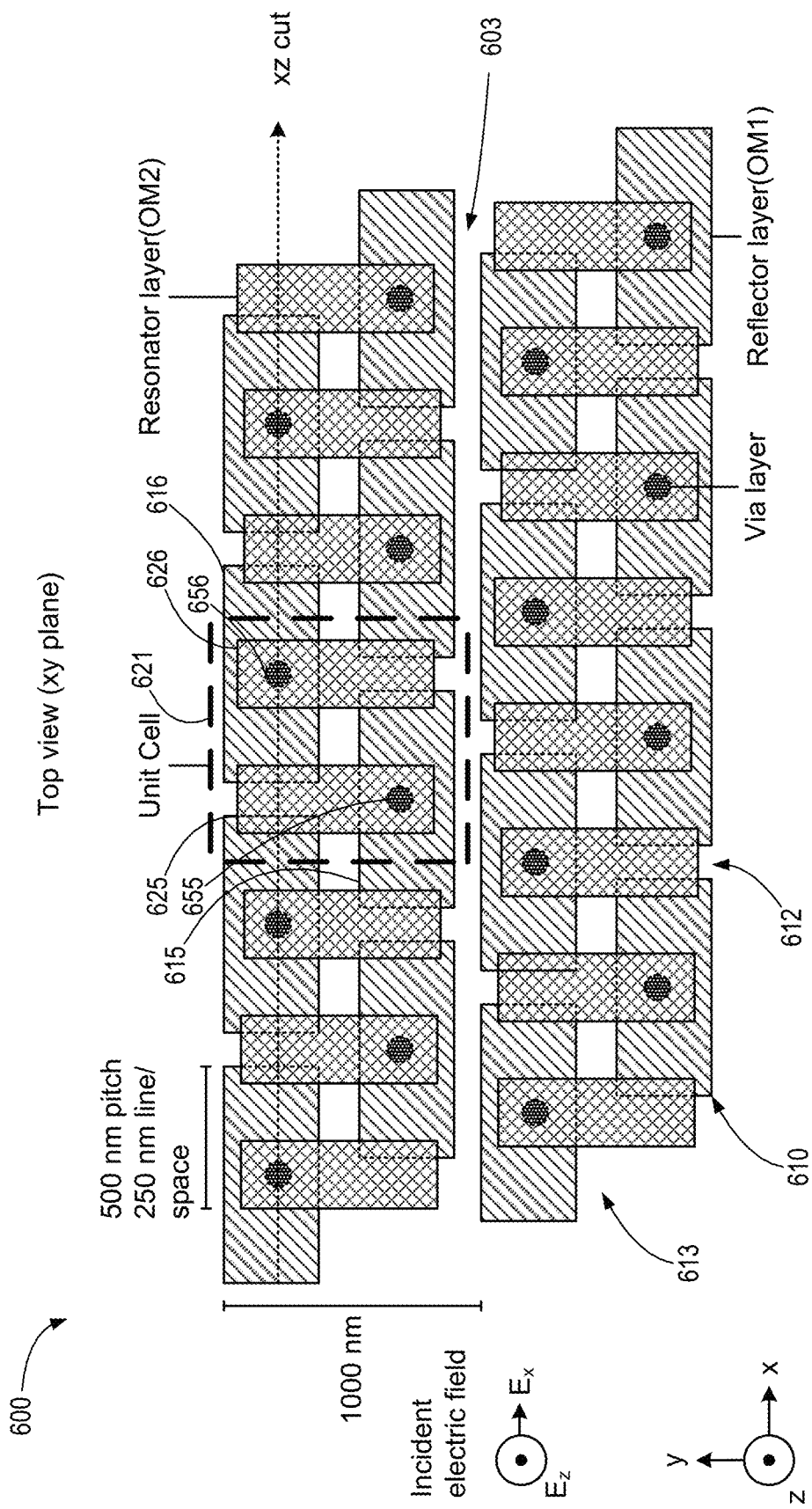
FIG. 6A illustrates a top-view diagram of a portion of a tunable optical metasurface with offset rows of pillars, according to one embodiment.

FIG. 6A illustrates a top-view diagram of the portion of a tunable optical metasurface 600 with offset rows of pillars 625, according to one embodiment. Each resonant unit cell 621 consists of two metallic optical pillars 625 and 626. Each metallic optical pillar 625 and 626 is connected with a conductive via 655 and 656 to one of the reflector patches 615 and 616. The metasurface 600 operates only on transverse magnetic (TM) polarization. Therefore, the x component of the electric field (perpendicular to the lengthwise or long sidewalls and parallel with the widthwise or short sidewalls) couples in the resonant unit cell 621 metallic optical pillars 625 and 626. The gaps or slots 603 between the metallic optical pillars 625 and 626 in the y direction do not couple to this field since the field is parallel to walls of the metal pillars (e.g., copper), and hence excluded from the slots 603. As shown in the cross-sectional view of FIG. 4, each reflector patch 615 connects to an underlying transistor (e.g., by conductor vias 465 in a second via layer 460 in FIG. 4).

The reflector layer 610 of reflector patches 615 and 616 includes off-resonance gaps 612 in the x-axis. The off-resonance gaps 612 provide electrical isolation between adjacent reflector patches 615 and 616 in the same row. The off-resonance gaps 612 have a width dimension selected to be off-resonant from the incident field, limiting the amount of field leaking into the reflector patches 615 and 616 of the reflector layer 610. Additionally, electrical isolation gaps 613 or channels in the y-axis are created to electrically isolate adjacent reflector patches 615 and 616 in adjacent rows. The optical field does not couple into the electrical isolation gaps 613 because the E-field is parallel to the metal walls of the reflector patches 615 and 616, so the dimensions of the electrical isolation gaps 613 may be different (e.g., smaller) than those of the off-resonance gaps 612 which are more carefully selected to be non-resonant.

Figure 6B:
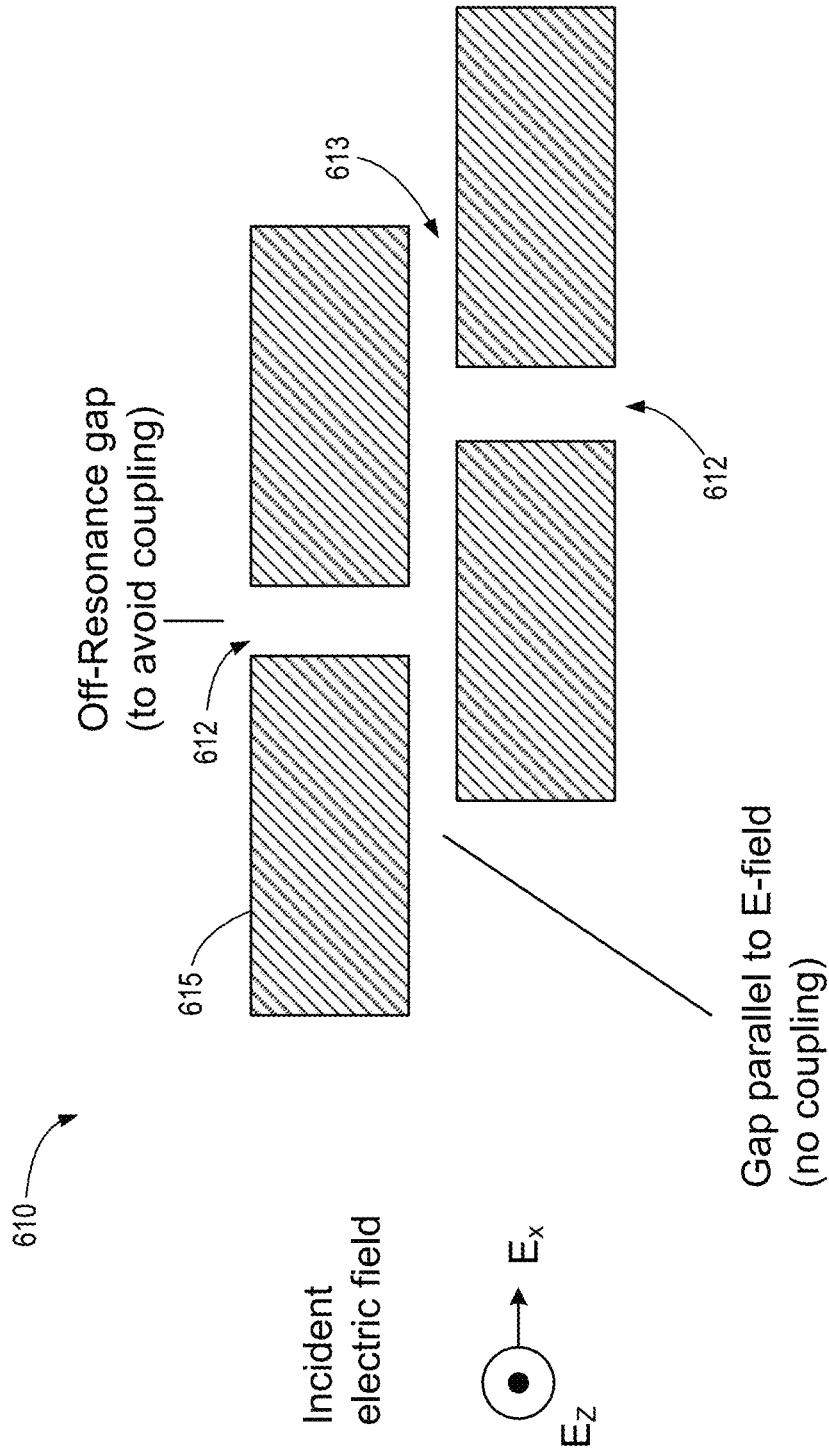
FIG. 6B illustrates an example diagram of an offset off-resonance gap in a reflector layer of the tunable optical metasurface to reduce or eliminate coupling between unit cells, according to one embodiment.

FIG. 6B illustrates an example diagram of an offset off-resonance gap 612 between adjacent reflector patches 615 of the reflector layer 610 to reduce or eliminate coupling between reflector patches 615 in the same row, according to one embodiment. Electrical isolation gaps 613 may be used to electrically isolate reflector patches 615 that are in different rows without consideration to avoid resonance. As described herein, reflector patches 615 of one row are staggered or offset with respect to the reflector patches 615 in adjacent rows to ensure that the off-resonance gaps 612 are staggered and not aligned with one another.

Figure 6C:
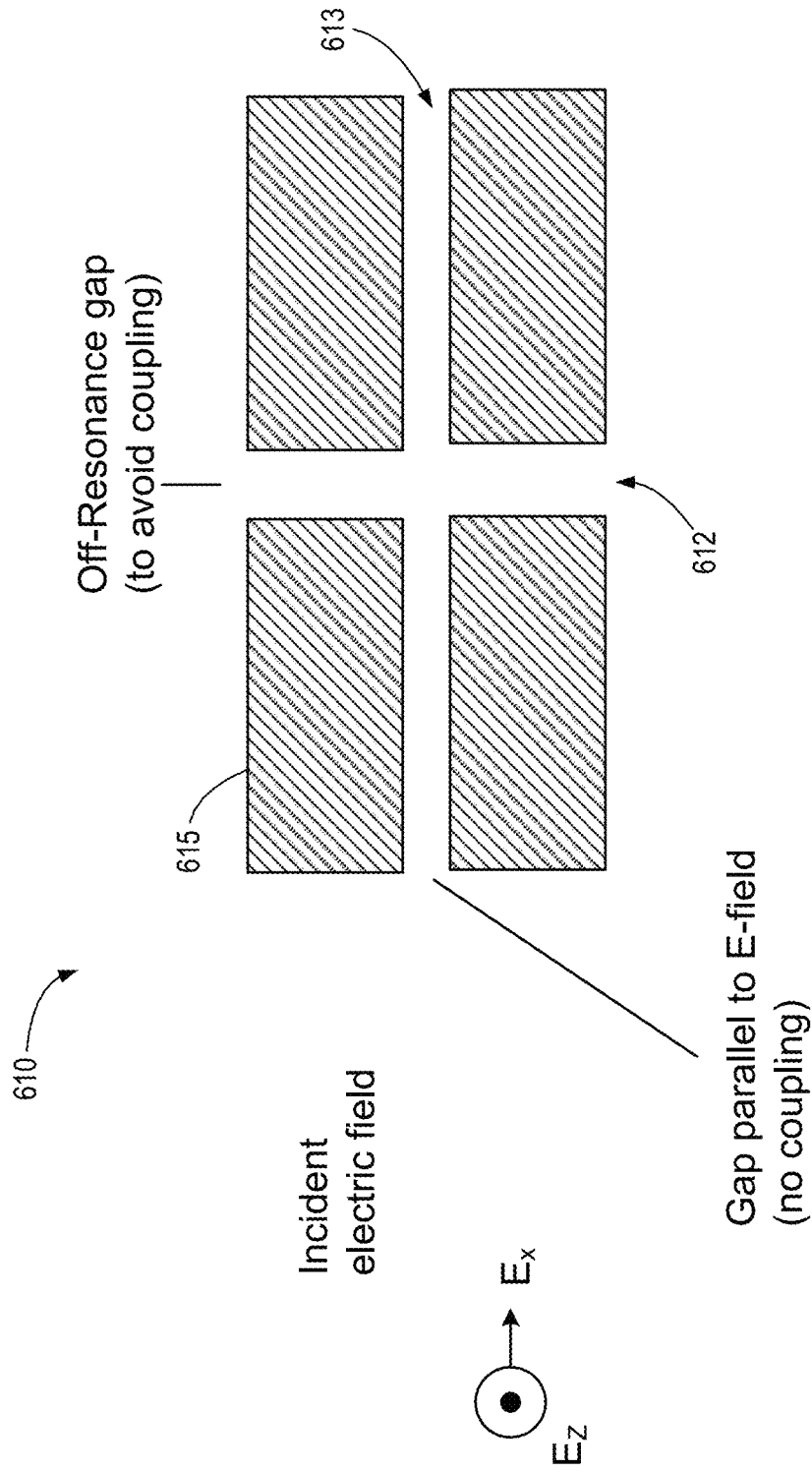
FIG. 6C illustrates an example diagram of an aligned off-resonance gap in a reflector layer of the tunable optical metasurface, according to one embodiment.

FIG. 6C illustrates an example diagram of an aligned off-resonance gap in a reflector layer of the tunable optical metasurface, according to one embodiment. Electrical isolation gaps 613 electrically isolate reflector patches 615 that are in different rows. The reflector patches 615 of one row are aligned with respect to the reflector patches 615 in adjacent rows. Off-resonance gaps 612 operate to reduce coupling between reflector patches in the same row.

Figure 6D:
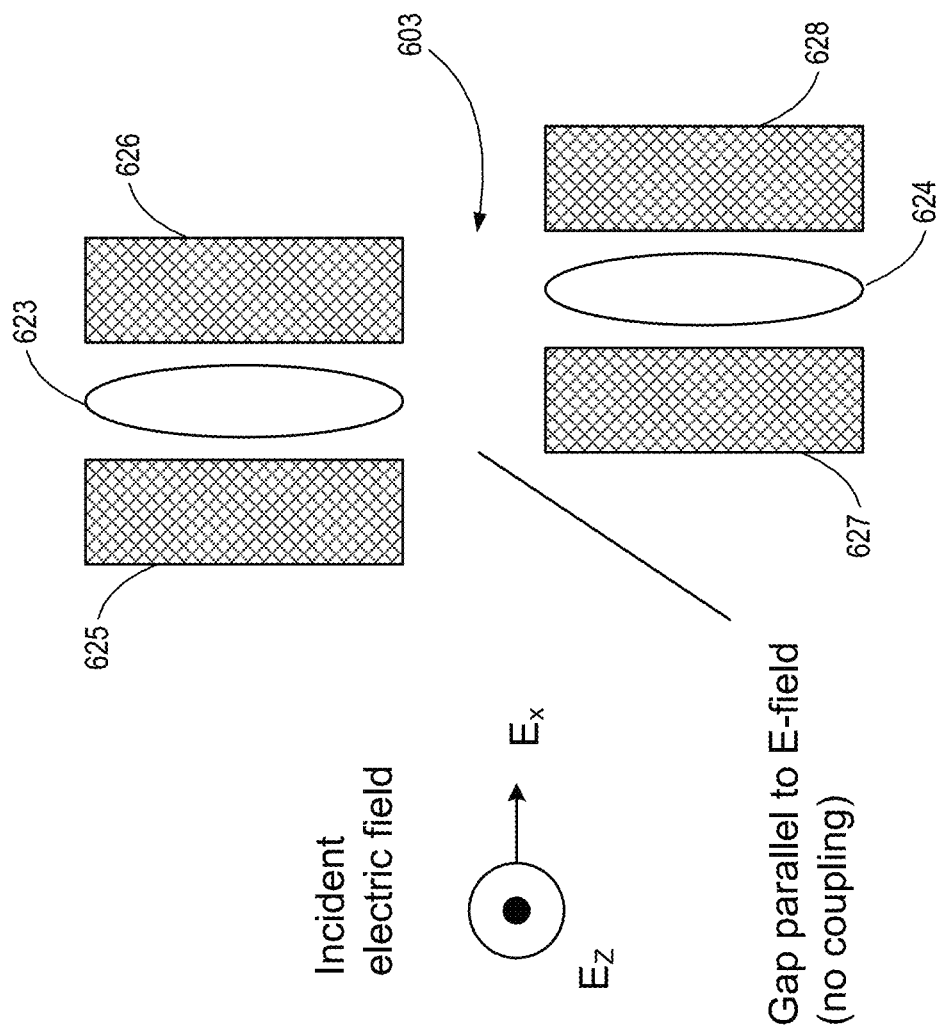
FIG. 6D illustrates an example diagram of optical fields in a resonator layer of the tunable optical metasurface with offset rows of pillars, according to one embodiment.

FIG. 6D illustrates an example diagram of optical fields in a resonator layer of a tunable optical metasurface with offset rows of pillars, according to one embodiment. As illustrated, the metallic optical pillars 625 and 626 are part of a first resonant unit cell. A first optical field 623 is illustrated between the metallic optical pillars 625 and 626. The illustrated example includes staggered or offset pillars 625 and 626. Accordingly, the metallic optical pillars 627 and 628 of the second resonant unit cell are offset, staggered, or misaligned with respect to the metallic optical pillars 625 and 626 of the first resonant unit cell. As such, the second optical field 624 in the second resonant unit cell is also staggered or offset with respect to the first optical field 623.

Figure 7A:
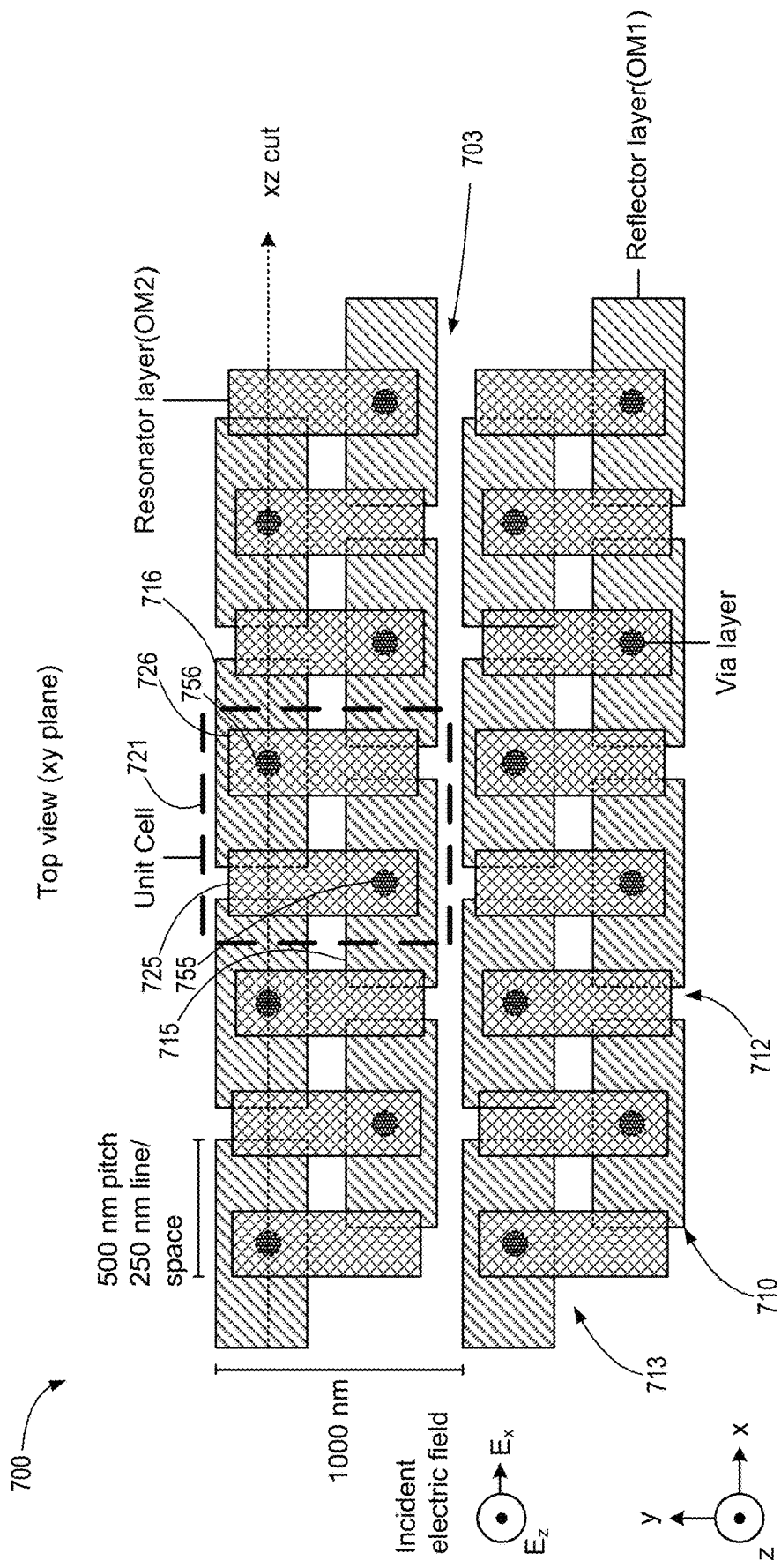
FIG. 7A illustrates a top-view diagram of a portion of a tunable optical metasurface with row-aligned pillars, according to one embodiment.

FIG. 7A illustrates a top-view diagram of the portion of a tunable optical metasurface 700 with row-aligned pillars 725, according to one embodiment. Each resonant unit cell 721 comprises two metallic optical pillars 725 and 726. Each metallic optical pillar 725 and 726 is connected with a conductive via 755 and 756 to one of the reflector patches 715 and 716. The metasurface 700 operates only on transverse magnetic (TM) polarization. Therefore, the x component of the electric field (perpendicular to the lengthwise or long sidewalls and parallel with the widthwise or short sidewalls) couples in the resonant unit cell 721 metallic optical pillars 725 and 726. The gaps or slots 703 between the metallic optical pillars 725 and 726 in the y direction do not couple to this field since the field is parallel to the walls of the metal pillars, and hence excluded from the slots 703. As shown in the cross-sectional view of FIG. 4, each reflector patch 715 connects to an underlying transistor (e.g., by conductor vias 465 in a second via layer 460 in FIG. 4).

The reflector layer 710 of reflector patches 715 and 716 includes off-resonance gaps 712 in the x-axis. The off-resonance gaps 712 provide electrical isolation between adjacent reflector patches 715 and 716 in the same row. The off-resonance gaps 712 have a width dimension selected to be off-resonance from the incident field, limiting the amount of field leaking into the reflector patches 715 and 716 of the reflector layer 710. Additionally, electrical isolation gaps 713 or channels in the y-axis are created to electrically isolate adjacent reflector patches 715 and 716 in adjacent rows. The optical field does not couple into the electrical isolation gaps 713 because the E-field is parallel to the metal walls of the reflector patches 715 and 716, so the dimensions of the electrical isolation gaps 713 may be different (e.g., smaller) than those of the off-resonance gaps 712 which are more carefully selected to be non-resonant.

FIG. 7B illustrates an example diagram of the off-resonance gap in the reflector layer of the tunable optical metasurface to reduce or eliminate coupling between resonant unit cells, according to one embodiment. Electrical isolation gaps 713 may be used to electrically isolate reflector patches 715 that are in different rows without consideration to avoid resonance. As described herein, reflector patches 715 of one row are staggered or offset with respect to the reflector patches 715 in adjacent rows to ensure that the off-resonance gaps 712 are staggered and not aligned with one another.

Figure 7C:
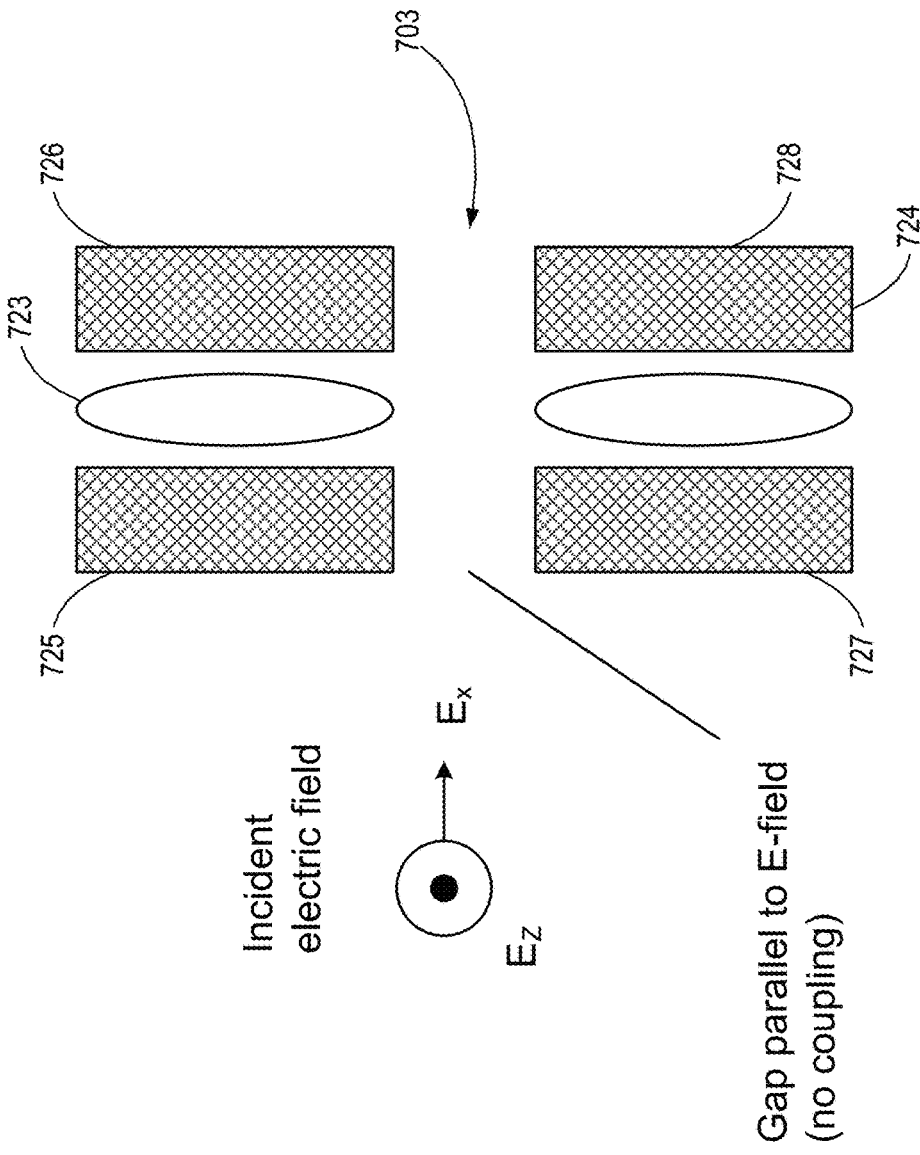
FIG. 7C illustrates an example diagram of optical fields in row-aligned pillars in a resonator layer of the tunable optical metasurface, according to one embodiment.

FIG. 7C illustrates an example diagram of optical fields in a row-aligned resonator layer of a tunable optical metasurface with row-aligned pillars, according to one embodiment. As illustrated, the metallic optical pillars 725 and 726 are part of a first resonant unit cell. A first optical field 723 is illustrated between the metallic optical pillars 725 and 726. The illustrated example includes column-aligned pillars. Accordingly, the metallic optical pillars 727 and 728 of the second resonant unit cell are aligned with respect to the metallic optical pillars 725 and 726 of the first unit cell. As such, the second optical field 724 in the second resonant unit cell is also aligned with respect to the first optical field 723.

Figure 8:
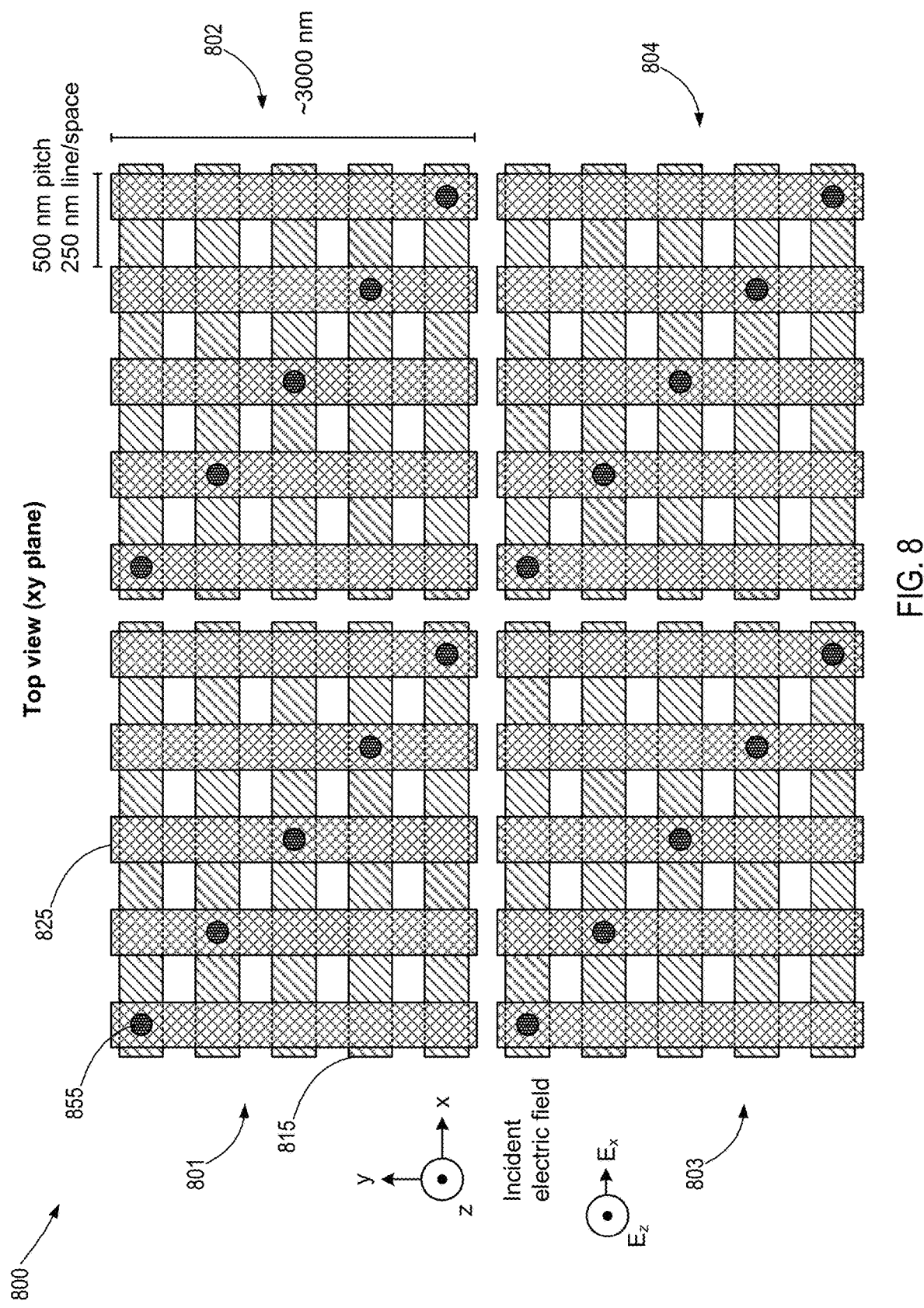
FIG. 8 illustrates an example diagram of another example of a metasurface, according to one embodiment.

FIG. 8 illustrates an example diagram of another example of a metasurface 800, according to one embodiment. In the illustrated example, the metasurface 800 includes multiple tiles 801, 802, 803, and 804. Each tile 801, 802, 803, and 804 includes multiple metallic optical pillars 825 that have lengths that are multiple wavelengths in the out-of-plane direction (vertical axis). The horizontal axis includes a pitch or interelement spacing of the metallic optical pillars 825 that is less than the diffraction limit (e.g., one-half of an operational wavelength). The illustrated metasurface 800 can be used to generate grating lobes in the vertical direction. For example, the metasurface 800 may be used to comb discrete beams along the vertical axis that can then be steered together. The metasurface 800 does not generate grating lobes in the horizontal axis because the interelement spacing of the metallic optical pillars 825 is below the diffraction limit. Each metallic optical pillar 825 is connected to an underlying elongated reflector patch 815 by a conductor via 855.

Figure 9:
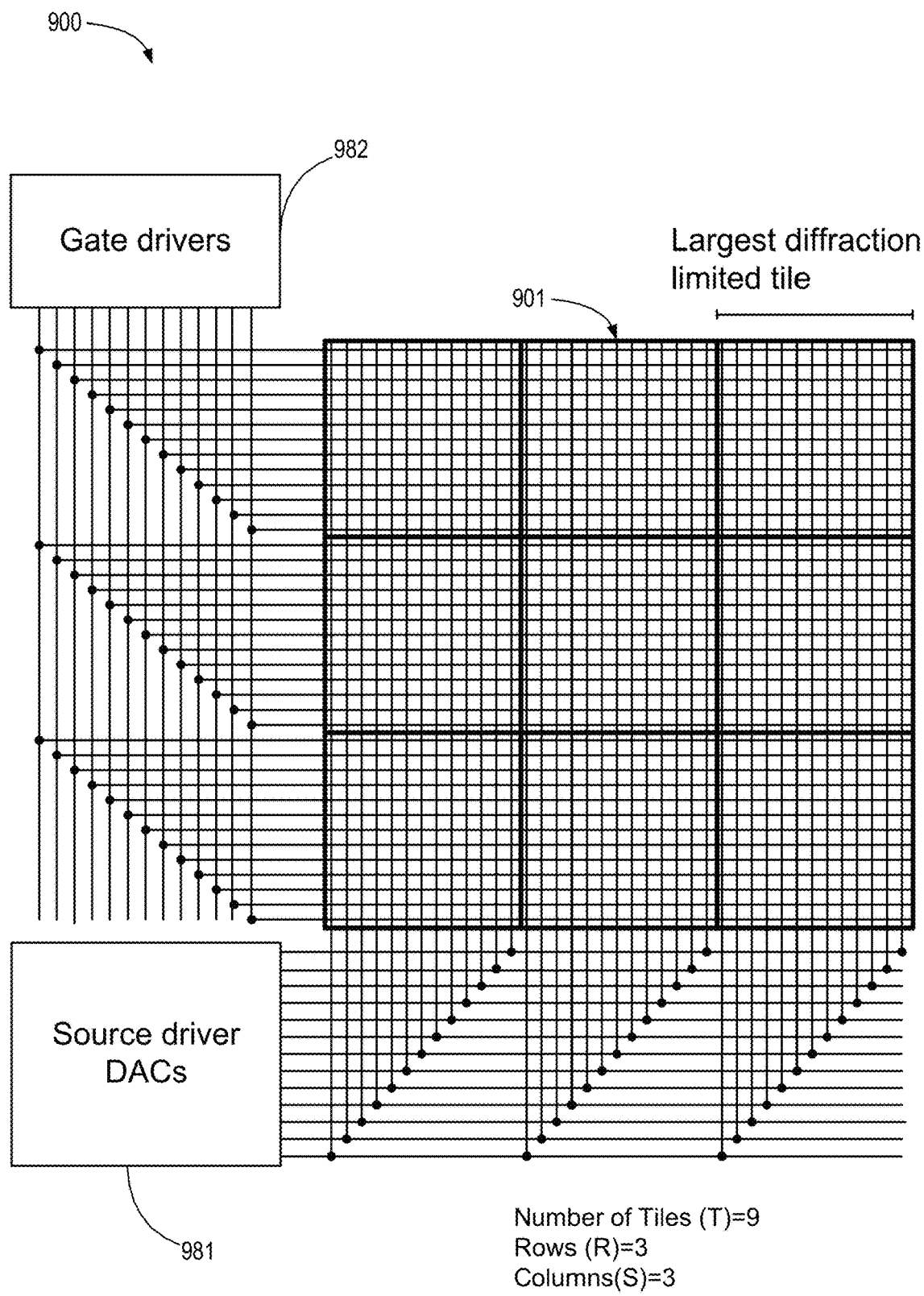
FIG. 9 illustrates an example of an active-matrix driver architecture with a tiled aperture, with each tile representing a diffraction-limited building block of individually addressable elements, according to one embodiment.

FIG. 9 illustrates an example of an active-matrix driver architecture 900 with a tiled aperture, with each tile 901 representing a diffraction-limited building block of individually addressable elements, according to one embodiment. As the aperture size of a metasurface increases, the number of elements grows as the square of the linear dimension. Furthermore, all or many of the voltage-controlled or tunable elements (e.g., metallic optical pillars) may need to be updated for every change in the phase modulation pattern (e.g., for a given steering angle). In some embodiments in which the metasurface is based on liquid crystal tuning of copper pillars, a switching speed between 25 and 100 microseconds may be utilized (e.g., 50 microseconds), and the entire array is updated on this time scale. In the illustrated example, the tiled metasurface includes nine tiles (T=9) arranged in three rows (R=3) and three columns (S=3).

The illustrated active-matrix driver architecture 900 reduces the complexity, power and/or size of the driver electronics by decoupling the aperture size from the angular resolution. The angular resolution in each axis is determined by the number of individually addressed resonant unit cells in each axis. The aperture size for a particular optical design is often much bigger than the diffraction-limited aperture dictated by the angular resolution requirement. Each tile 901 can share the same set of source drivers, such as digital-to-analog converters 981 or "DACs" for column addressing and gate drivers 982 for row addressing). The active-matrix architecture 900 for a tiled metasurface, including the various control lines, capacitors, and/or transistors, along with the DACs 981 and gate drivers 982 are referred to herein as part of a controller or control layer of the metasurface.

Alternatively, a unit cell architecture can be implemented with passive matrix addressing. In this case, each unit cell may have two pillars, including a first pillar driven by wires propagating in the x-axis (carrying row driving voltages) and another pillar connected to wires propagating in the y-axis (carrying column driving voltages). If the unit cell is below the diffraction limit, the light will experience scattering (phase delay) from both pillars. Therefore, an optical function of the form phi=f(x)+f(y) can be implemented.

Figure 10A:
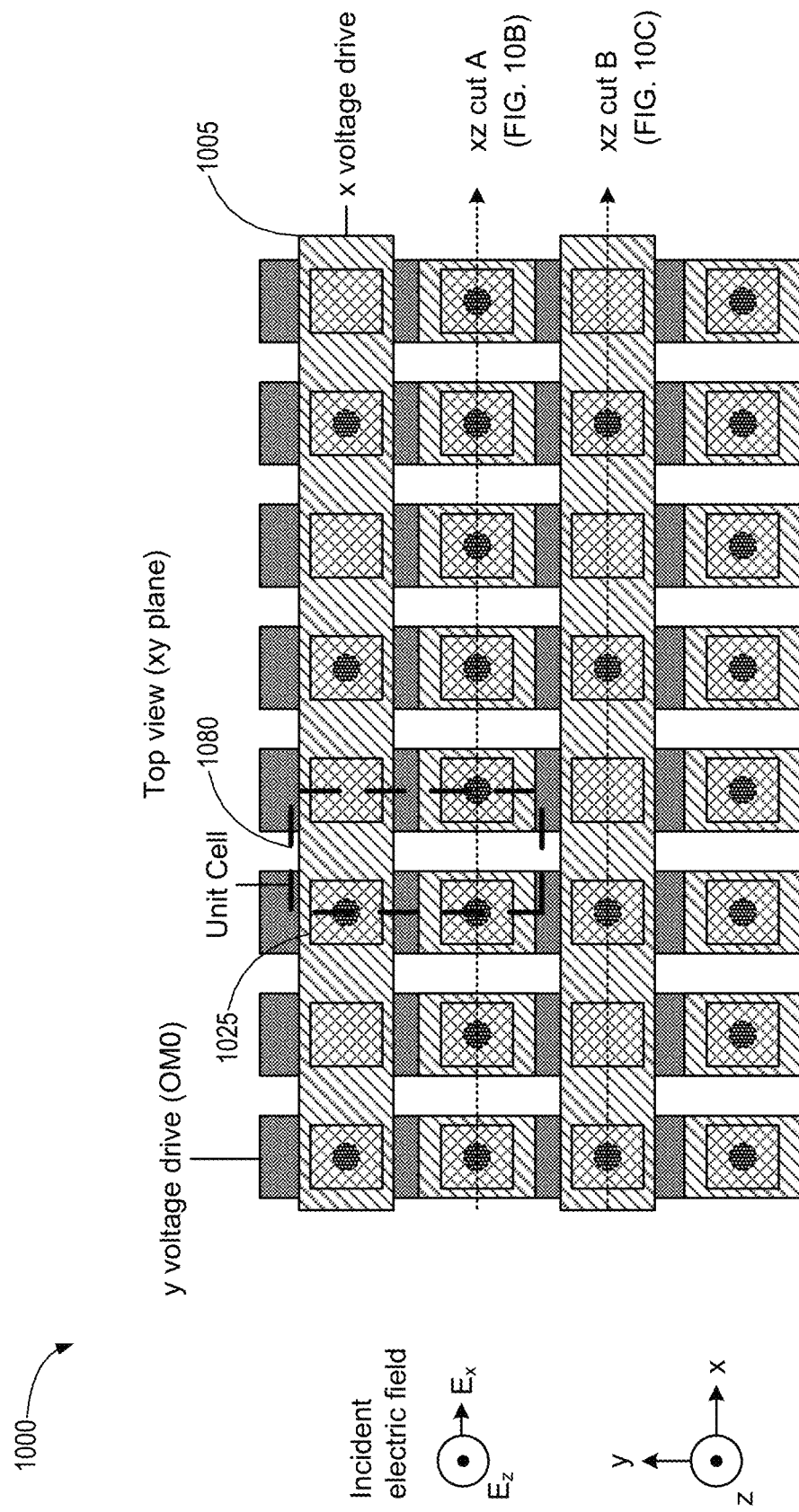
FIG. 10A illustrates an example diagram of a top view of an XY plane of a tunable optical metasurface, according to one embodiment.

FIG. 10A illustrates an example diagram of a top view of the XY plane of a tunable optical metasurface 1000, according to one embodiment. In the illustrated example, the unit cell 1080 includes four metallic optical pillars, including one metallic optical pillar 1025 that is connected to a continuous control line 1005 that provides a drive voltage (x voltage). All the metallic optical pillars connected to the continuous control line 1005 (illustrated with the connection dots) are driven to the same voltage via the continuous control line 1005.

Figure 10B:
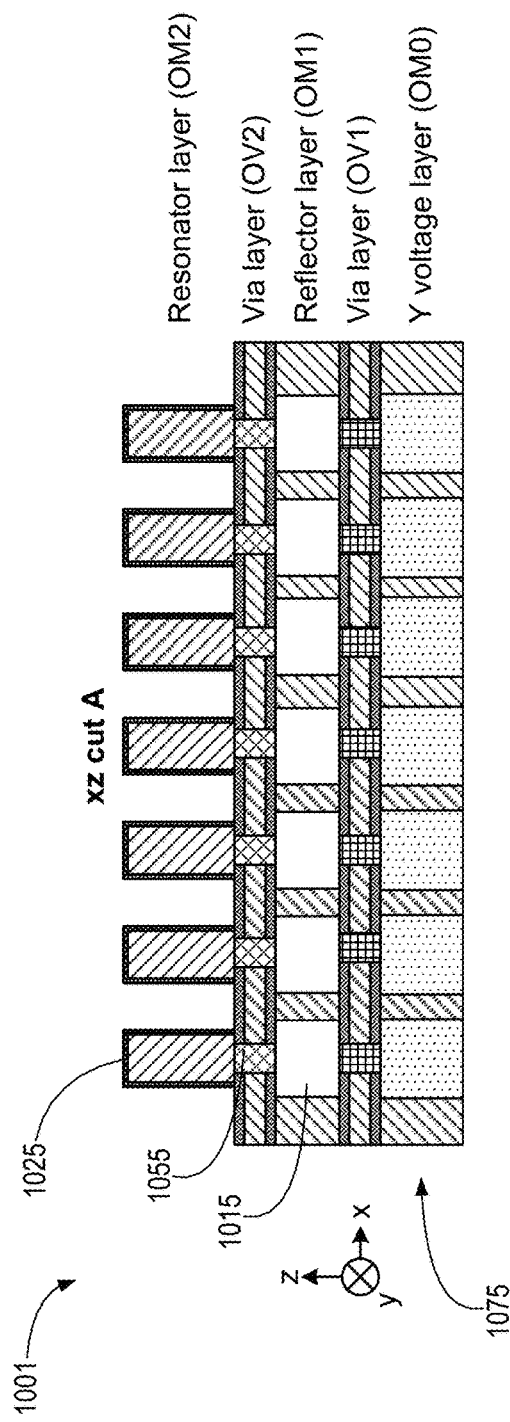
FIG. 10B illustrates an example diagram of a first cut-away side view of an XZ plane of the tunable optical metasurface of FIG. 10A, according to one embodiment.

FIG. 10B illustrates an example diagram of a first cross-sectional side view 1001 of the XZ plane of the tunable optical metasurface 1000 of FIG. 10A at the indicated "cut A" location, according to one embodiment. As illustrated, each metallic optical pillar 1025 is connected to an underlying reflector patch 1015 by a conductor via 1055 and to a control line and/or transistor in the "Y voltage layer" 1075.

Figure 10C:
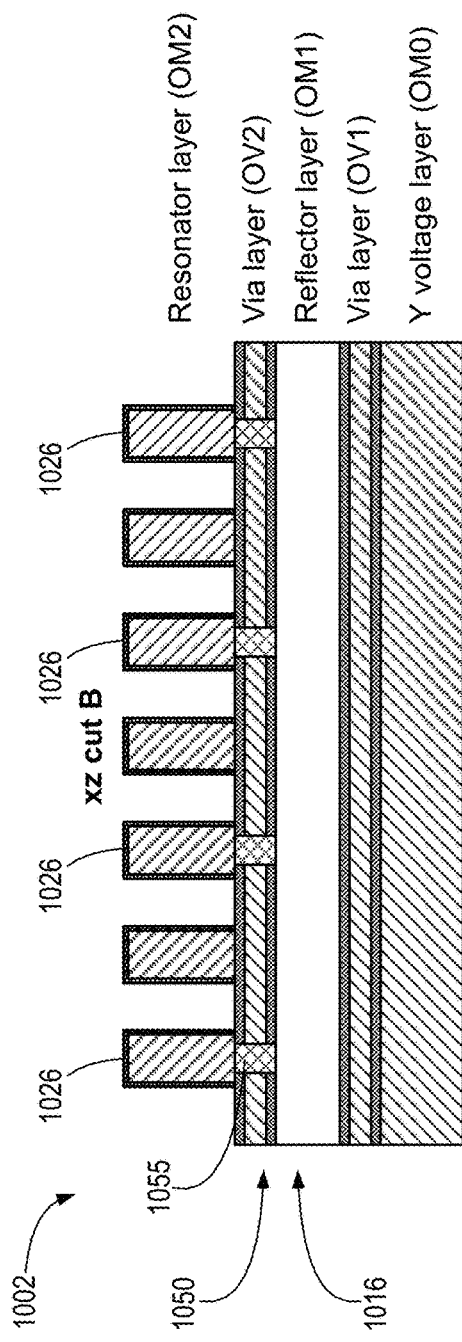
FIG. 10C illustrates an example diagram of a second cut-away side view of the XZ plane of the tunable optical metasurface of FIG. 10A, according to one embodiment.

FIG. 10C illustrates an example diagram of a second cross-sectional side view 1002 of the XZ plane of the tunable optical metasurface of FIG. 10A at the indicated "cut B" location, according to one embodiment. As illustrated, every other (alternating) metallic optical pillar 1026 is connected to a continuous reflector patch 1016 by conductor vias 1055 in the dielectric via layer 1050.

Figure 10D:
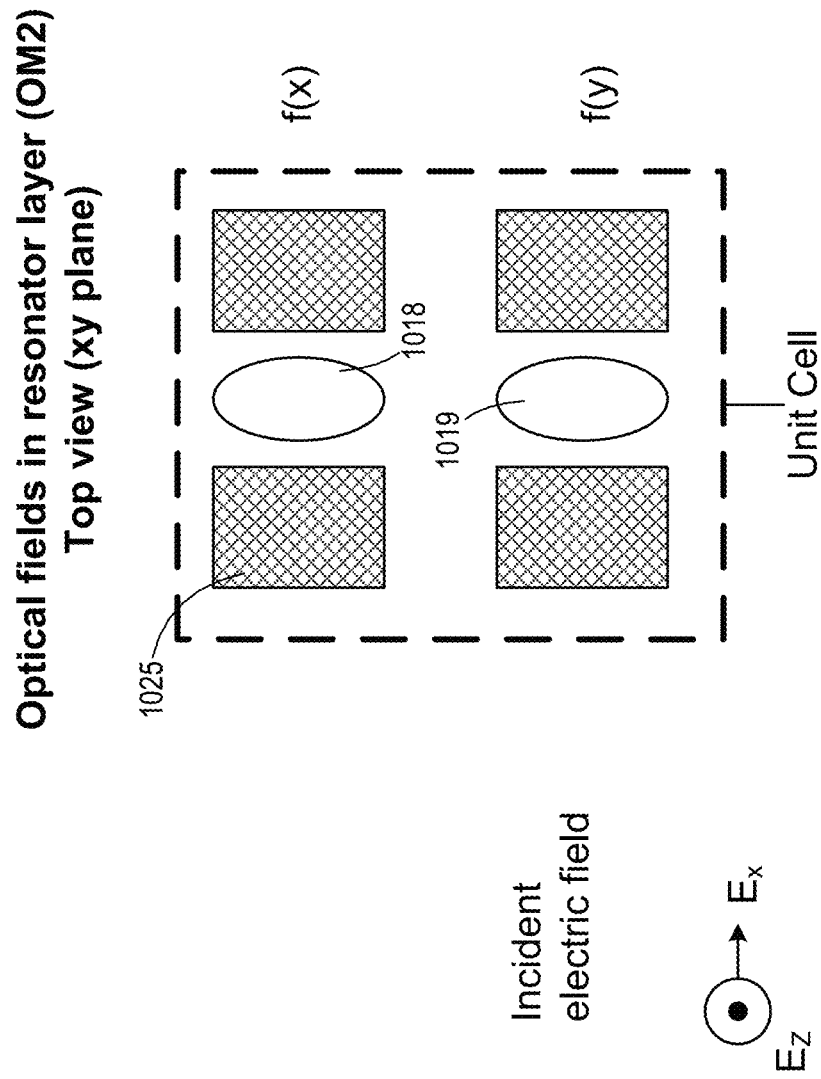
FIG. 10D illustrates optical fields in the resonator layer from the perspective of the top view of the XY plane of the tunable optical metasurface of FIG. 10A, according to one embodiment.

FIG. 10D illustrates the optical fields 1018 and 1019 between metallic optical pillars 1025 in the resonator layer from the perspective of the top view of the XY plane of the tunable optical metasurface 1000 of FIG. 10A, according to one embodiment.

FIG. 11 illustrates an example diagram of a control layer 1100 of a two-dimensional optical metasurface with active-matrix addressing and pixel-level storage capacitance, according to one embodiment. The active-matrix control system includes rows and columns of transistors. Each transistor is connected to a unique metallic optical pillar (e.g., through a corresponding reflector patch and/or conductor via, as previously described). The row conductor lines and column conductor lines of the control layer 1100 may be integrated as a layer between a substrate and a reflective layer. The active-matrix control system may sequentially drive a digital voltage onto the row conductor of each successive (sequential or non-sequential) row of transistors, according to a defined refresh rate.

The digital voltage driven onto the row conductor activates the transistors in that row. The controller then drives various analog voltage values (e.g., a pattern of voltage values) onto the column conductor lines to drive target voltage values through the sources of each of the transistors and onto the capacitors and metallic pillars connected to the drains of each of the respective transistors. The active matrix architecture enables the resonant unit cells of the metasurface to exhibit a unique pattern of phase responses (ϕ) as a function of the row drive (x) and the column select (y), expressible as ϕ=f(x,y), as illustrated at 1150. Each "pixel" or "unit cell" 1110 of the control layer 1100 includes a transistor with a gate connected to a row conductor, a source connected to a column conductor, and a drain connected to a storage capacitor. Though not illustrated, the drain of each transistor is connected to a metallic pillar of one of the resonant unit cells of a metasurface in parallel with the illustrated storage capacitor.

Figure 12A:
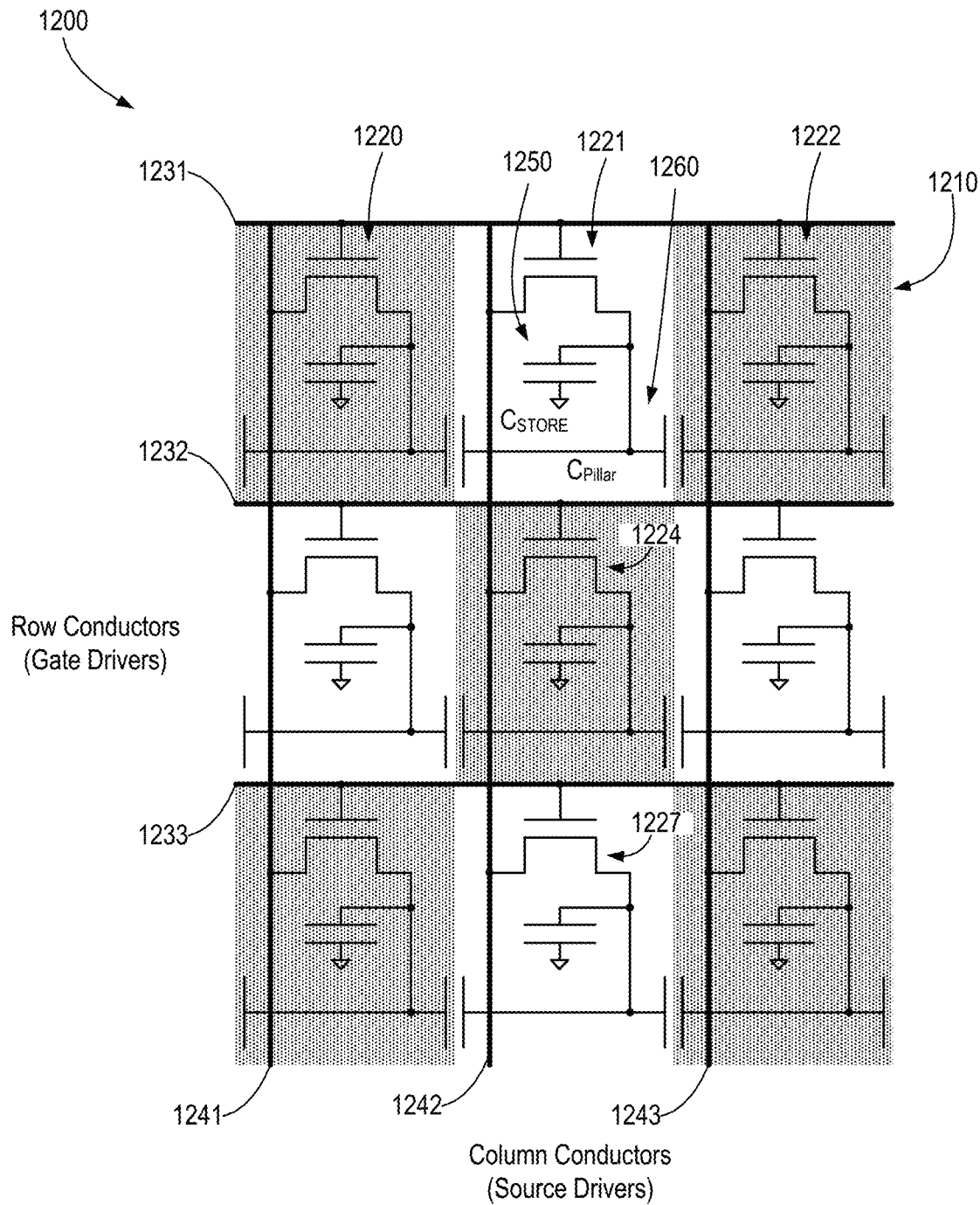
FIG. 12A illustrates an example active-matrix control layer with pixel-level grounded storage capacitance, according to one embodiment.

FIG. 12A illustrates an example active-matrix control layer 1200 with pixel-level grounded storage capacitance, according to one embodiment. The illustrated active matrix control layer 1200 is simplified to include nine pixels 1210 in a three-by-three arrangement. Adjacent pixels alternate shading between white and shaded to identify the distinct pixels 1210. As illustrated, the pixel 1210 includes a transistor 1222. The adjacent pixel to the left of the pixel 1210 includes a transistor 1221, and the left-most pixel includes a transistor 1220. Each pixel, but with reference specifically to the pixel containing the transistor 1221, includes a pillar capacitance of the metallic pillar 1260, representative of the capacitive coupling of the metallic pillar with the metallic pillars of adjacent pixels. Each pixel also includes a storage capacitor 1250 that is grounded. The gate of the transistor 1221 is connected to the row conductor 1231, the source of the transistor 1221 is connected to the column conductor 1242, and the drain of the transistor 1221 is connected to the metallic pillar 1260 and the storage capacitor 1250 in parallel.

As illustrated, each of the row conductors 1231, 1232, and 1233 is connected to the gates of the transistors in each respective row. Similarly, each of the column conductors 1241, 1242, and 1243 are connected to the sources of the transistors in each respective column. Driving a digital voltage on row conductor 1231 results in the activation of the transistors 1220, 1221, and 1222. With transistors 1220, 1221, and 1222 activated, the controller may drive an analog voltage on column conductors 1241, 1242, and 1243 that is directed through the sources of transistors 1220, 1221, and 1222 onto their respective storage capacitors (including storage capacitor 1250) and metallic pillars (including metallic pillar 1260). Although column conductor 1242 is connected to the sources of transistors 1224 and 1227, the analog voltage is not passed through transistors 1224 and 1227 because row conductors 1232 and 1233 are not currently being driven to activate the gates of transistors 1224 and 1227.

Figure 12B:
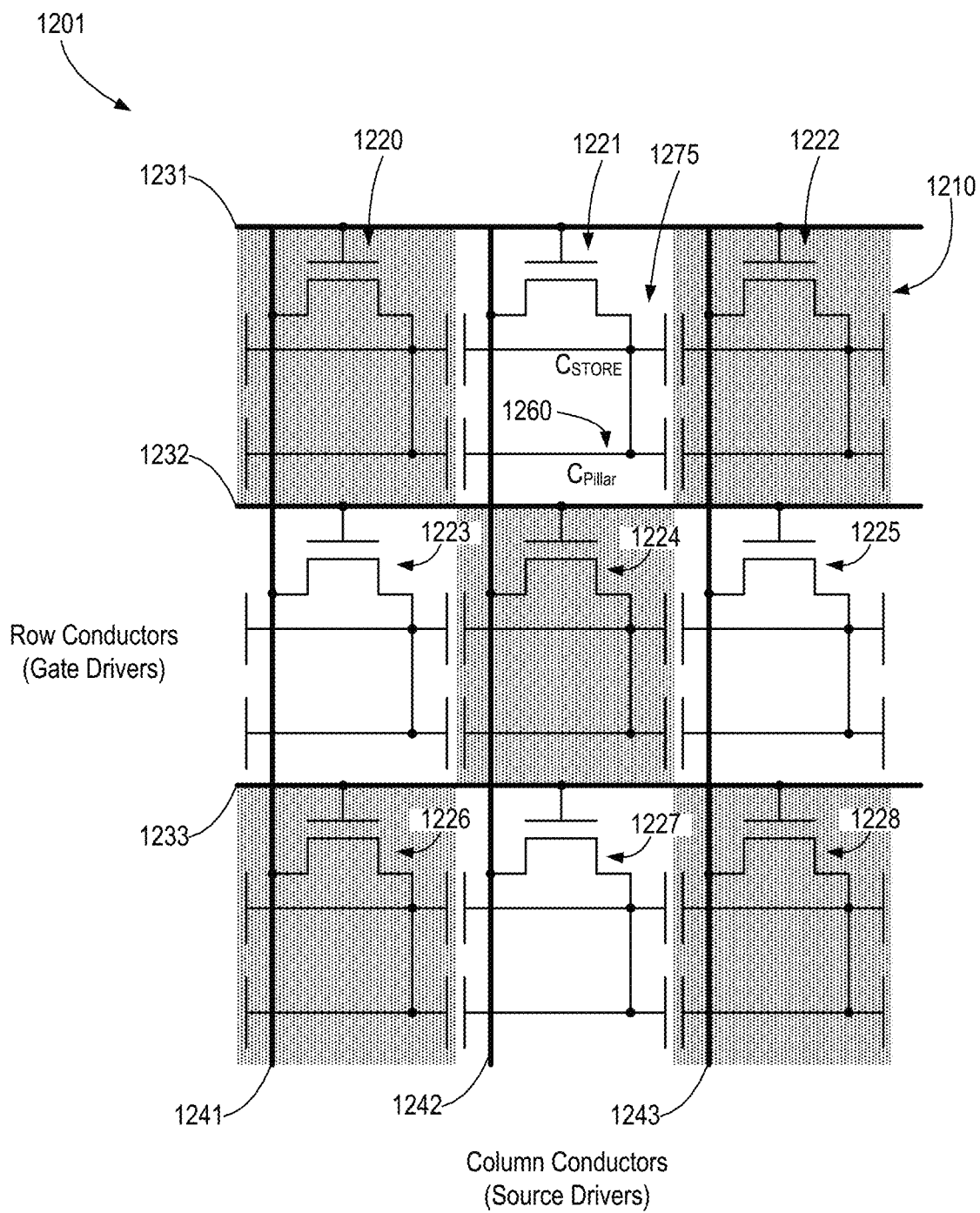
FIG. 12B illustrates an example active-matrix control layer with pixel-level differential storage capacitance, according to one embodiment.

FIG. 12B illustrates another example of an active-matrix control layer 1201 with pixel-level differential storage capacitance, according to one embodiment. The illustrated embodiment is similar to the embodiment described in conjunction with FIG. 12A, except that the storage capacitor 1275 is arranged in a differential configuration in which the storage capacitor 1275 of each pixel is connected to the storage capacitors of the adjacent pixels in the same row.

The drain of the transistor 1220 is still connected to the pillar 1260 (represented as a pillar capacitor) in parallel with the storage capacitor 1275.

The following illustrates an example of sequential row activation according to a refresh rate of 50 microseconds. A controller drives a digital voltage on row conductor 1231 to activate transistors 1220, 1221, and 1222 at a time T=0. The controller drives analog voltage values on column conductors 1241, 1242, and 1243 to apply target voltages (e.g., 2 Volts, 4 Volts, and 1 Volt) to the metallic pillars associated with transistors 1220, 1221, and 1222. Using an example refresh cycle time of 900 nanoseconds, at time T=0.9 microseconds, the controller stops driving row conductor 1231 so that transistors 1220, 1221, and 1222 are deactivated. Immediately, a short time later, the controller begins driving row conductor 1232 to activate transistors 1223, 1224, and 1225. Even though transistors 1220, 1221, and 1222 are deactivated, the metallic pillars and storage capacitors remain at or close to the driven voltages.

With transistors 1223, 1224, and 1225 now activated, the controller drives column conductors 1241, 1242, and 1243 to apply target voltages (e.g., 4 Volts, 1 Volt, and 2 Volts) to the metallic pillars associated with transistors 1223, 1224, and 1225. The process I repeated for row conductor 1233 and the metallic pillars associated with transistors 1226, 1227, and 1228. The controller may cease driving the row and column conductors for some time until the next refresh cycle beings. At time T=50 microseconds, according to the 50-microsecond refresh rate, the controller once again drives the row conductor 1231 to activate and refresh (and optionally change) the voltages applied to the metallic pillars associated with the transistors 1220, 1221, and 1222 by driving analog voltages on the column conductors 1241, 1242, and 1243.

As described herein, the storage capacitors 1275 facilitate driving and maintain the target voltages on the associated metallic pillars in between refresh cycles. Without the storage capacitors 1275, a higher refresh rate would be required, the target pillar voltage would not be maintained between refresh cycles, and/or the final voltage value of a metallic pillar would deviate significantly from the driven voltage value.

Figure 13A:
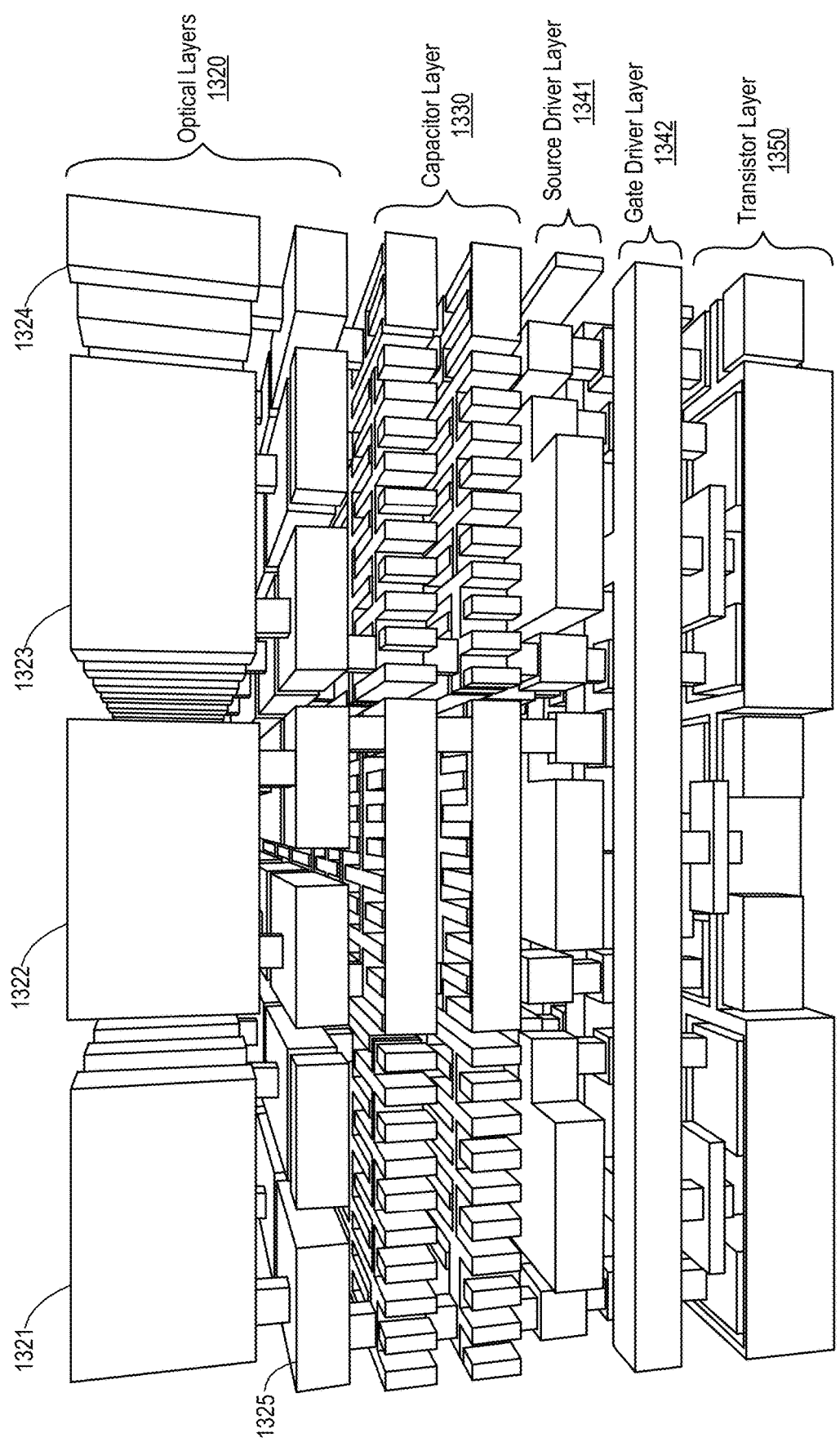
FIG. 13A illustrates a perspective view of a simplified block diagram of an optical metasurface, including the optical layers, capacitor layers, driver routing layers, and a transistor layer, according to one embodiment.

FIG. 13A illustrates a perspective view of a simplified block diagram of an optical metasurface, including the optical layers 1320, capacitor layers 1330, driver routing layers 1341 and 1342, and transistor layer 1350, according to one embodiment. As illustrated, the optical layer 1320 includes a two-dimensional array of metallic pillars arranged in rows and columns. From the illustrated perspective, a column with three metallic pillars 1321, 1322, and 1323 and one partial metallic pillar 1324, is visible. In the illustrated perspective, the rows of metallic pillars go into and out of the page. The gaps between adjacent pillars in each row of pillars (into the page) form optical resonators. A tunable dielectric material, such as liquid crystal or the like, is deposited within the resonator layer to fill the space between the pillars in all directions, such that tunable dielectric material is positioned within the optical resonators formed by the gaps between row-adjacent pillars. Examples of suitable tunable dielectric materials that have tunable refractive indices include liquid crystals, electro-optic polymer, electro-optic crystals, chalcogenide glasses, and/or various semiconductor materials.

The optical layer 1320 includes a two-dimensional array of elongated rectangular reflector patches 1325 (only one of which is labeled to avoid obscuring the drawing). The rectangular reflector patches 1325 extend lengthwise along parallel rows. The rectangular reflector patches 1325, the dielectric via layers, and the conductor vias may be arranged and configured according to any of the various embodiments described herein. The capacitor layers 1330 include two layers or sublayers of interdigitated capacitors. Each metallic pillar of the optical layer 1320 may be electrically connected to one or more of the interdigitated capacitors within the capacitor layer 1330. The driver routing layers include a source driver routing layer 1341 and a gate driver routing layer 1342. In previously described embodiments, the row conductors were used to drive the gates of transistors, and the column conductors were used to drive the sources of the transistors. However, in the illustrated block diagram, the roles are reversed, such that the row conductor is used to drive the gates of transistors, and the column conductor is used to drive the sources of the transistors. The transistor layer 1350 of the metasurface device includes a plurality of transistors (MOSFETs) integrated within a layer. In some embodiments, the transistor layer 1350 is integral to a substrate or base layer. In other embodiments, the metasurface includes a separate substrate or base layer (not shown).

Figure 13B:
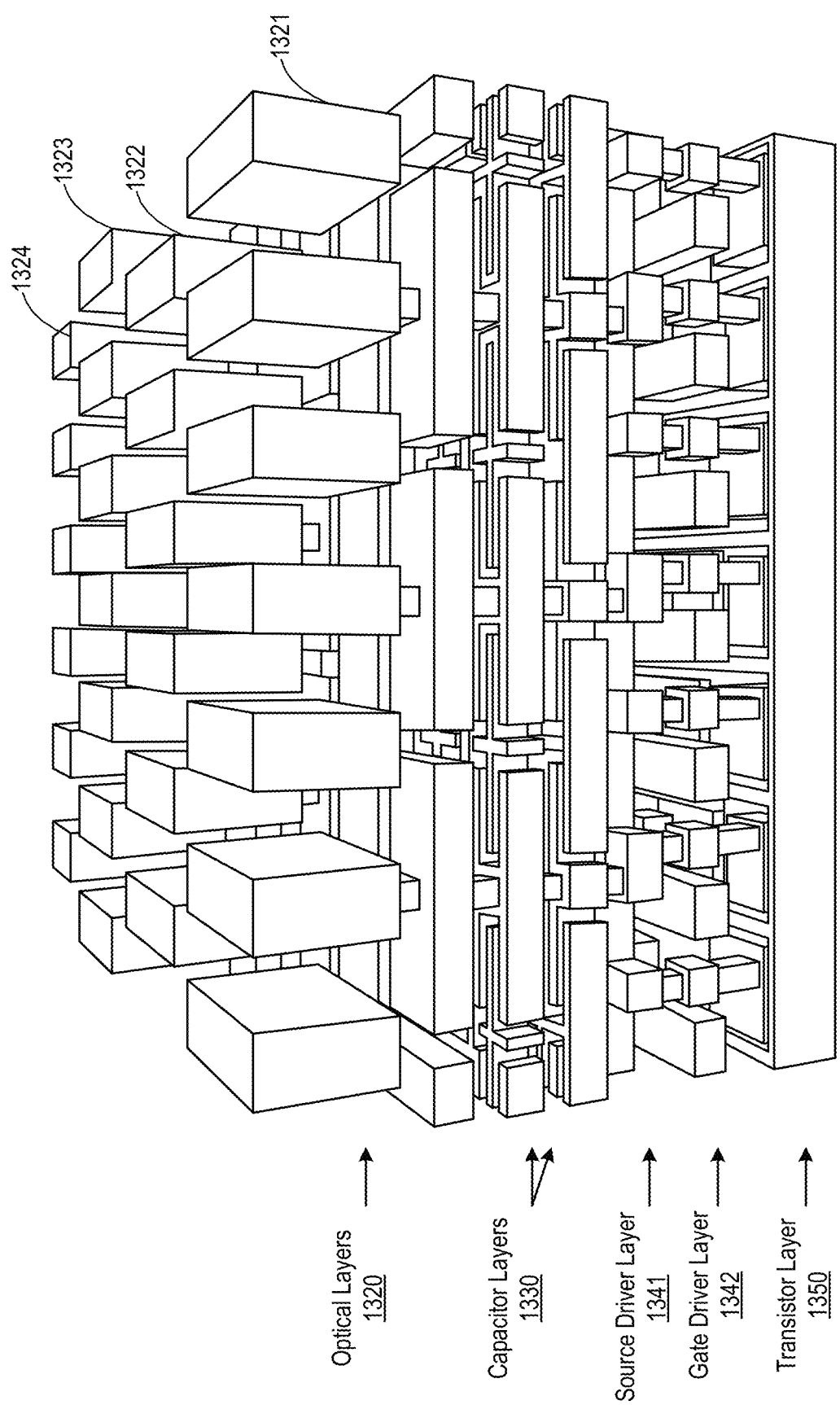
FIG. 13B illustrates another perspective view of the simplified block diagram of the optical metasurface, including the optical layers, capacitor layers, driver routing layers, and transistor layer, according to one embodiment.

FIG. 13B illustrates another perspective view of the simplified block diagram of the optical metasurface, including the optical layers 1320, capacitor layers 1330, driver routing layers 1341 and 1342, and transistor layer 1350, according to one embodiment. Again, the optical layer 1320 includes a two-dimensional array of metallic pillars arranged in rows and columns. In the illustrated example, the columns of metallic pillars are slightly offset or staggered from one another, such that the metallic pillars within each column are not straight. For example, the metallic pillars 1321, 1322, 1323, and 1324 are described as being within the same "column" despite being staggered or offset slightly with respect to one another. The presently described systems and methods for two-dimensional active-matrix addressing of rows and columns are compatible with the illustrated staggered-column embodiment and with alternative straight-column embodiments. As with other embodiments in which the columns of metallic pillars are aligned, each metallic pillar in the optical layer 1320 is connected in parallel to one or more of the storage capacitors in one or more of the capacitor layers 1330 and one of the transistor devices in the transistor layer 1350.

FIGS. 14A and 14B illustrate perspective views of a simplified block diagram of a unit cell 1400 of an optical metasurface. The unit cell 1400 includes two metallic pillars 1411 and 1412 within an optical layer 1410. While the interlayer connections are difficult to view in the simplified block diagram, the capacitor layer 1420 includes a first storage capacitor 1421 connected to the first metallic pillar 1411 and a second storage capacitor 1422 connected to the second metallic pillar 1412. The unit cell 1400 includes driver routing layers 1431 and 1432 with row and column conductors, as described in detail herein. As previously noted, the roles of the row and column conductors for driving the gates and sources of the respective transistors are interchangeable. The unit cell 1400 includes two transistors in the transistor layer 1440, including a first transistor connected to the first metallic pillar 1411 in parallel with the first storage capacitor 1421 and a second transistor connected to the second metallic pillar 1412 in parallel with the second storage capacitor 1422.

Figure 15A:
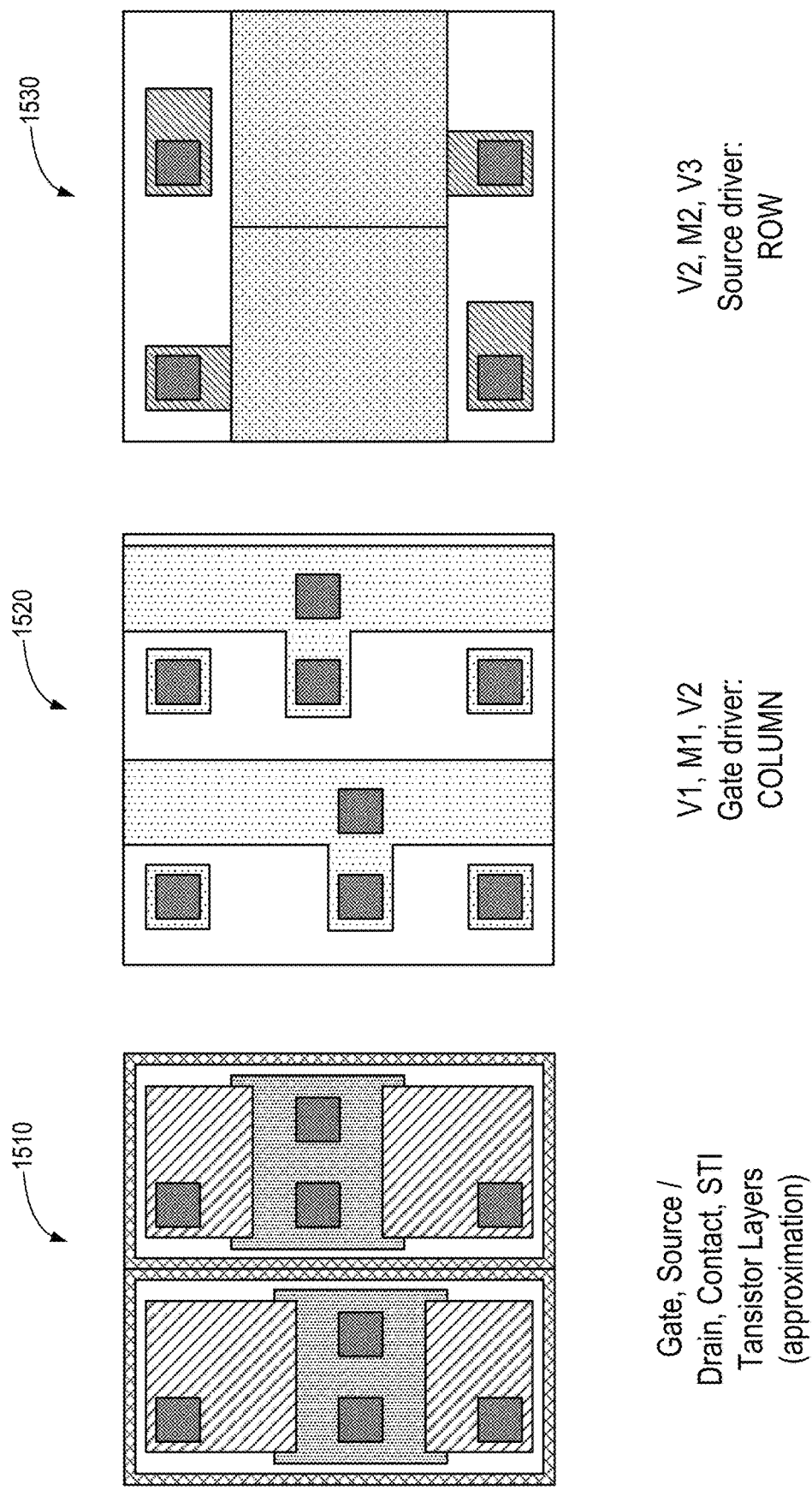
FIG. 15A illustrates top-down layout views of the transistor layer, gate driver routing layer, and source driver routing layer of a unit cell of an optical metasurface, according to one embodiment.

FIG. 15A illustrates top-down views of several layers of a unit cell of an optical metasurface, according to one embodiment. The illustrated layout views include examples of a transistor layer 1510 with two transistors, a column driver routing layer 1520 with connections to the gates of the transistors, and a source driver routing layer 1530 with connections to the sources of the transistors.

Figure 15B:
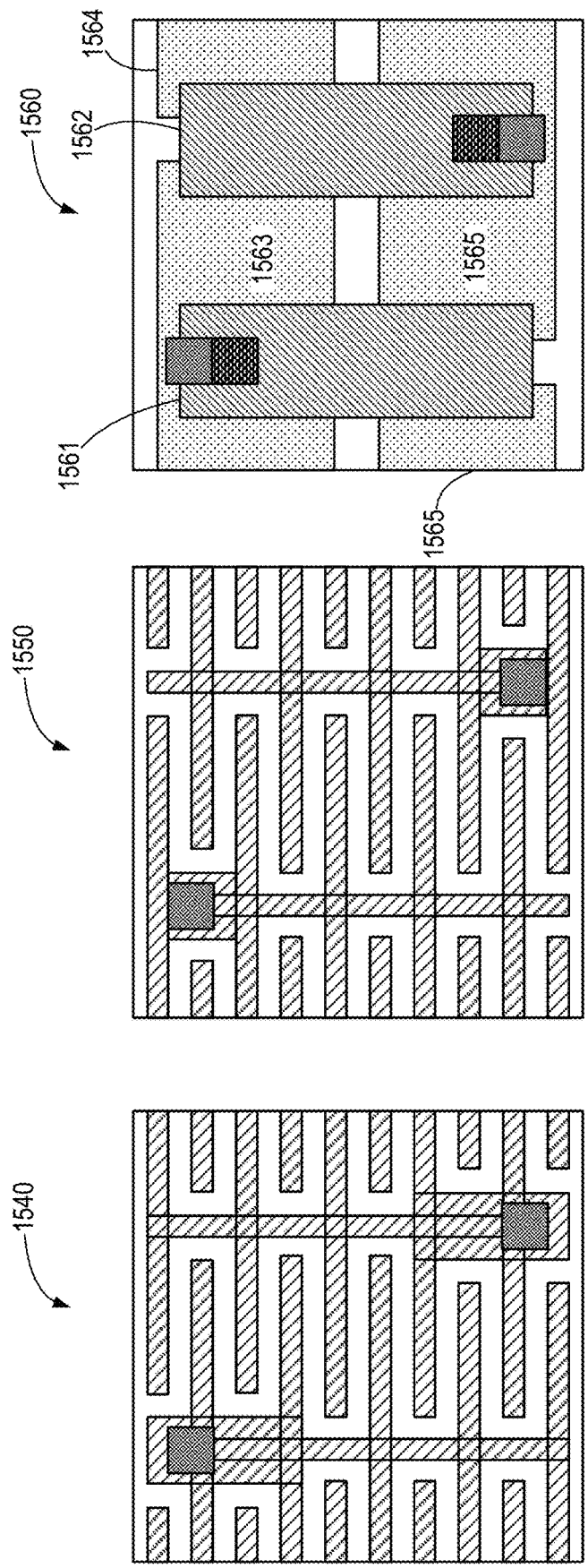
FIG. 15B illustrates top-down layout views of the capacitor layers and optical layers of a unit cell of an optical metasurface, according to one embodiment.

FIG. 15B illustrates top-down views of several layers of a unit cell of an optical metasurface, according to one embodiment. The illustrated layout views include a first capacitor layer 1540 with a first interdigitated storage capacitor and a second capacitor layer 1550 with a second interdigitated storage capacitor. A layout view of an optical layer 1560 is also provided that includes two metallic pillars 1561 and 1562 from a row of metallic pillars and portions of four underlying reflector patches 1563, 1564, 1565, and 1565.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The following claims are also included as part of this disclosure.

What is claimed is:

1. An optical metasurface device, comprising:
   an optical resonator layer with a two-dimensional array of metallic pillars arranged in rows and columns, and a tunable dielectric material that has a tunable refractive index positioned within gaps between adjacent metallic pillars in each row of metallic pillars;
   an optically reflective layer positioned between a substrate layer and the optical resonator layer to reflect incident optical radiation;
   driver routing layers with a row conductor for each row of metallic pillars and a column conductor for each column of metallic pillars;
   a transistor layer with a plurality of transistor devices, wherein each transistor device is connected to and configured to be selectively driven by one of the row conductors and one of the column conductors, wherein a subset of the metallic pillars in the optical resonator layer are active metallic pillars, and wherein each active metallic pillar is connected to at least one of the transistor devices in the transistor layer; and
   a controller to selectively apply a pattern of voltages to the active metallic pillars by:
      sequentially driving a voltage on each row conductor, according to a refresh rate, to temporarily activate the transistor devices of the row of metallic pillars associated with each respective row conductor for a refresh cycle time; and
      driving each column conductor to apply a target voltage to each active metallic pillar in the row of metallic pillars associated with the temporarily activated transistor devices during each respective refresh cycle time.

2. The metasurface device of claim 1, wherein all the metallic pillars in the optical resonator layer are active metallic pillars.

3. The metasurface device of claim 1, further comprising:
   a capacitor layer with a plurality of storage capacitors,
   wherein each active metallic pillar in the optical resonator layer is connected to one of the storage capacitors in the capacitor layer and one of the transistor devices in the transistor layer.

4. The metasurface device of claim 3, wherein each storage capacitor comprises at least one of: a metal-insulator-metal (MIM) capacitor, a metal-oxide-metal (MOM) capacitor, and a metal-oxide-semiconductor (MOS) capacitor.

5. The metasurface device of claim 3, wherein the capacitor layer includes multiple sublayers of interdigitated storage capacitors.

6. The metasurface device of claim 3, wherein each storage capacitor comprises more than one discrete capacitor connected in parallel.

7. The metasurface device of claim 3, wherein the storage capacitors comprise grounded storage capacitors, such that one terminal of each storage capacitor is connected to ground.

8. The metasurface device of claim 3, wherein the capacitor layer is integrated within the same layer as the transistor layer, and wherein each of the plurality of storage capacitors comprises a trench capacitor adjacent to one of the transistor devices.

9. The metasurface device of claim 1, wherein each transistor device comprises a cascode amplifier.

10. The metasurface device of claim 1, wherein the sequentially driven voltage on each row conductor comprises a digital signal to drive a gate of each respective transistor device.

11. The metasurface device of claim 1, wherein each column of metallic pillars is connected to a unique column conductor, such that each column of metallic pillars is individually driven.

12. The metasurface device of claim 1, wherein at least some of the column conductors are electrically connected, such that the columns of metallic pillars associated with the electrically connected column conductors are commonly driven.

13. The metasurface device of claim 1, wherein the tunable dielectric material comprises one or more of: liquid crystal, an electro-optic polymer, an electro-optical crystal, and a chalcogenide glass.

14. The metasurface device of claim 1, wherein the optically reflective layer comprises a two-dimensional array of reflector patches.

15. The metasurface device of claim 14, wherein each active metallic pillar is electrically connected to at least one of the reflector patches.

16. The metasurface device of claim 1, wherein each metallic pillar comprises one of: copper, silver, gold, aluminum, and silver-coated copper.

17. The metasurface device of claim 1, further comprising:
   a passivation coating of an optically transparent dielectric material applied to each metallic pillar.

18. The metasurface device of claim 1, wherein the two-dimensional array of metallic pillars is arranged in a two-dimensional tiled configuration with T metasurface tiles arranged in R rows of metasurface tiles and S columns of metasurface tiles, wherein each metasurface tile includes a two-dimensional arrangement of N metallic pillars in rows and M columns, where T, R, S, N, and M are integer values.

19. The metasurface device of claim 1, wherein the metasurface device comprises one metasurface tile in a multi-tile metasurface.

20. An optical metasurface device, comprising:
an optical resonator layer with a two-dimensional array of metallic pillars arranged in rows and columns, and a tunable dielectric material that has a tunable refractive index positioned within gaps between adjacent metallic pillars in each row of metallic pillars;
an optically reflective layer positioned between a substrate layer and the optical resonator layer to reflect incident optical radiation;
driver routing layers with a row conductor for each row of metallic pillars and a column conductor for each column of metallic pillars;
a transistor layer with a plurality of transistor devices, wherein each transistor device is connected to and configured to be selectively driven by one of the row conductors and one of the column conductors, wherein a subset of the metallic pillars in the optical resonator layer are active metallic pillars, and wherein each active metallic pillar is connected to at least one of the transistor devices in the transistor layer; and
a capacitor layer with a plurality of storage capacitors, wherein each active metallic pillar in the optical resonator layer is connected to one of the storage capacitors in the capacitor layer and one of the transistor devices in the transistor layer,
wherein at least some of the storage capacitors comprise differential storage capacitors, where a first terminal of each differential storage capacitor is connected to an active metallic pillar in parallel with a respective transistor device and a second terminal of each differential storage capacitor is connected to an adjacent differential storage capacitor of an adjacent active metallic pillar.

21. An optical metasurface device, comprising:
an optical resonator layer with a two-dimensional array of metallic pillars arranged in rows and columns, and a tunable dielectric material that has a tunable refractive index positioned within gaps between adjacent metallic pillars in each row of metallic pillars;
an optically reflective layer positioned between a substrate layer and the optical resonator layer to reflect incident optical radiation;
driver routing layers with a row conductor for each row of metallic pillars and a column conductor for each column of metallic pillars;
a transistor layer with a plurality of transistor devices, wherein each transistor device is connected to and configured to be selectively driven by one of the row conductors and one of the column conductors, wherein a subset of the metallic pillars in the optical resonator layer are active metallic pillars, and wherein each active metallic pillar is connected to at least one of the transistor devices in the transistor layer; and
a capacitor layer with a plurality of storage capacitors, wherein each active metallic pillar in the optical resonator layer is connected to one of the storage capacitors in the capacitor layer and one of the transistor devices in the transistor layer,
wherein each storage capacitor has a capacitance between 0.1 femtofarads (fF) and 3.0 femtofarads (fF).

22. An optical metasurface device, comprising:
an optical resonator layer with a two-dimensional array of metallic pillars arranged in rows and columns, and a tunable dielectric material that has a tunable refractive index positioned within gaps between adjacent metallic pillars in each row of metallic pillars;
an optically reflective layer positioned between a substrate layer and the optical resonator layer to reflect incident optical radiation;
driver routing layers with a row conductor for each row of metallic pillars and a column conductor for each column of metallic pillars;
a transistor layer with a plurality of transistor devices, wherein each transistor device is connected to and configured to be selectively driven by one of the row conductors and one of the column conductors, wherein a subset of the metallic pillars in the optical resonator layer are active metallic pillars, and wherein each active metallic pillar is connected to at least one of the transistor devices in the transistor layer; and
a capacitor layer with a plurality of storage capacitors, wherein each active metallic pillar in the optical resonator layer is connected to one of the storage capacitors in the capacitor layer and one of the transistor devices in the transistor layer,
wherein the driver routing layers, the transistor layer, and the capacitor layer are positioned between the substrate layer and the optically reflective layer.

23. The metasurface device of claim 22, wherein the capacitor layer is positioned between the optically reflective layer and the driver routing layers, and wherein the transistor layer is positioned between the driver routing layers and the substrate layer.

24. An optical metasurface device, comprising:
an optical resonator layer with a two-dimensional array of metallic pillars arranged in rows and columns, and a tunable dielectric material that has a tunable refractive index positioned within gaps between adjacent metallic pillars in each row of metallic pillars;
an optically reflective layer positioned between a substrate layer and the optical resonator layer to reflect incident optical radiation;
driver routing layers with a row conductor for each row of metallic pillars and a column conductor for each column of metallic pillars; and
a transistor layer with a plurality of transistor devices, wherein each transistor device is connected to and configured to be selectively driven by one of the row conductors and one of the column conductors,
wherein a subset of the metallic pillars in the optical resonator layer are active metallic pillars,
wherein each active metallic pillar is connected to at least one of the transistor devices in the transistor layer, and
wherein each transistor device comprises a metal-oxide-semiconductor field-effect transistor (MOSFET).

25. The metasurface device of claim 24, wherein a gate of each MOSFET is connected to the row conductor associated with the active metallic pillar to which each respective transistor device is connected.

26. The metasurface device of claim 25, wherein a source of each MOSFET device is connected to the column conductor associated with the active metallic pillar to which each respective transistor device is connected, and wherein each active metallic pillar is connected to a drain of each MOSFET.

27. The metasurface device of claim 24, further comprising:

a capacitor layer with a plurality of storage capacitors,
wherein each active metallic pillar in the optical resonator layer is connected in parallel to one of the storage capacitors in the capacitor layer and a drain of each MOSFET.

28. An optical metasurface device, comprising:
an optical resonator layer with a two-dimensional array of metallic pillars arranged in rows and columns, and a tunable dielectric material that has a tunable refractive index positioned within gaps between adjacent metallic pillars in each row of metallic pillars;
an optically reflective layer positioned between a substrate layer and the optical resonator layer to reflect incident optical radiation;
driver routing layers with a row conductor for each row of metallic pillars and a column conductor for each column of metallic pillars; and
a transistor layer with a plurality of transistor devices, wherein each transistor device is connected to and configured to be selectively driven by one of the row conductors and one of the column conductors,
wherein a subset of the metallic pillars in the optical resonator layer are active metallic pillars,
wherein each active metallic pillar is connected to at least one of the transistor devices in the transistor layer,
wherein the driver routing layers comprise:
a row driver routing layer with the row conductors; and
a column driver routing layer with the column conductors, and
wherein the driver routing layers and the transistor layer are positioned between the substrate layer and the optically reflective layer.

29. The metasurface device of claim 28, wherein the metasurface device comprises one metasurface tile in a multi-tile metasurface.

30. The metasurface device of claim 28, further comprising:
a capacitor layer with a plurality of storage capacitors,
wherein each active metallic pillar in the optical resonator layer is connected to one of the storage capacitors in the capacitor layer and one of the transistor devices in the transistor layer.

31. The metasurface device of claim 28, wherein each transistor device comprises a metal-oxide-semiconductor field-effect transistor (MOSFET).

32. The metasurface device of claim 28, further comprising:

a controller to selectively apply a pattern of voltages to the active metallic pillars by:
sequentially driving a voltage on each row conductor, according to a refresh rate, to temporarily activate the transistor devices of the row of metallic pillars associated with each respective row conductor for a refresh cycle time; and
driving each column conductor to apply a target voltage to each active metallic pillar in the row of metallic pillars associated with the temporarily activated transistor devices during each respective refresh cycle time.

33. The metasurface device of claim 28, wherein the tunable dielectric material comprises one or more of: liquid crystal, an electro-optic polymer, an electro-optical crystal, and a chalcogenide glass.

34. The metasurface device of claim 28, wherein the optically reflective layer comprises a two-dimensional array of reflector patches.

35. An optical metasurface device, comprising:
an optical resonator layer with a two-dimensional array of metallic pillars arranged in rows and columns, and a tunable dielectric material that has a tunable refractive index positioned within gaps between adjacent metallic pillars in each row of metallic pillars;
an optically reflective layer positioned between a substrate layer and the optical resonator layer to reflect incident optical radiation;
driver routing layers with a row conductor for each row of metallic pillars and a column conductor for each column of metallic pillars; and
a transistor layer with a plurality of transistor devices, wherein each transistor device is connected to and configured to be selectively driven by one of the row conductors and one of the column conductors,
wherein a subset of the metallic pillars in the optical resonator layer are active metallic pillars,
wherein each active metallic pillar is connected to at least one of the transistor devices in the transistor layer, and
wherein a length of each metallic pillar in a direction perpendicular to each row is less than a smallest wavelength of an operational bandwidth, and wherein a width of each metallic pillar along each row is less than one-half of the smallest wavelength of the operational bandwidth.

* * * * *